Aug. 4, 1959 P. GRAHAM 2,897,668
BUILDING CONSTRUCTION
Filed Dec. 1, 1951 4 Sheets-Sheet 1
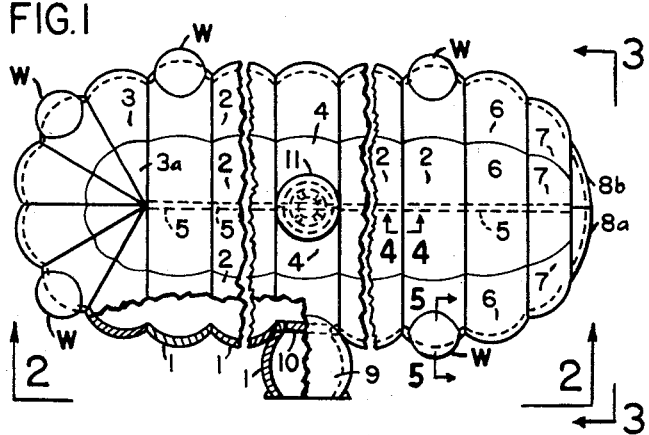
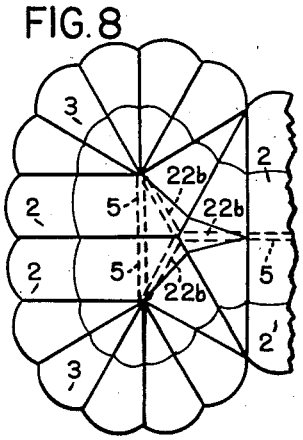
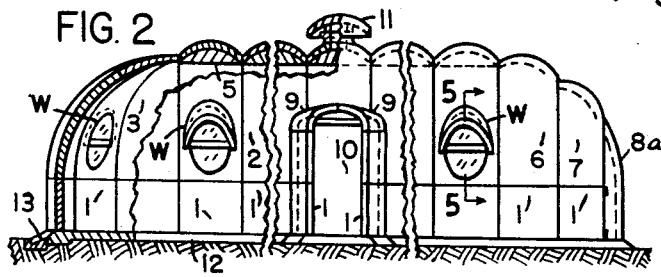
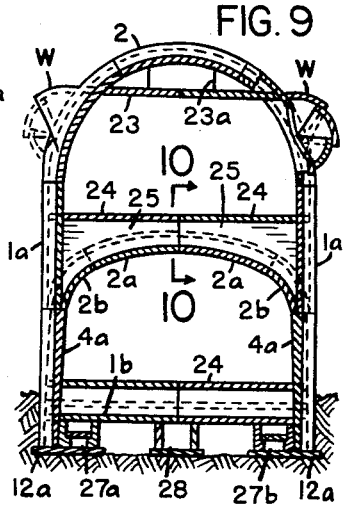
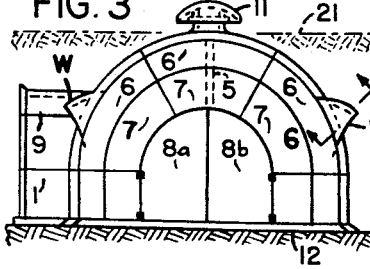
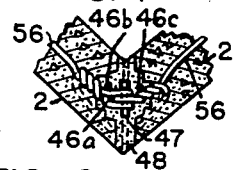
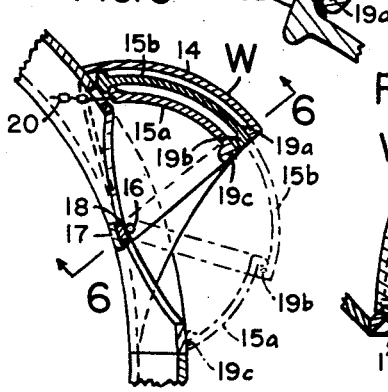
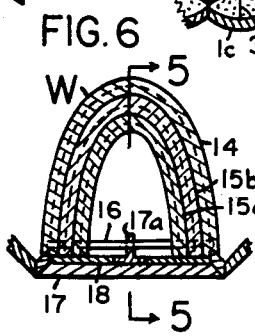
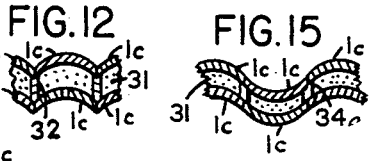
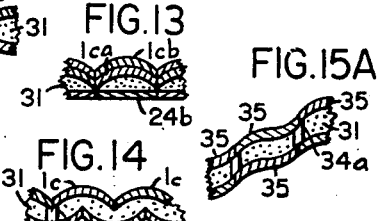
INVENTOR
PHILLIP GRAHAM
By William J. Ruano
ATTORNEY

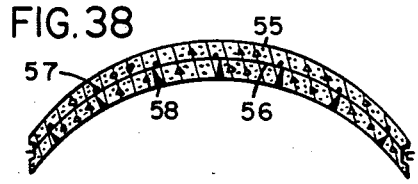
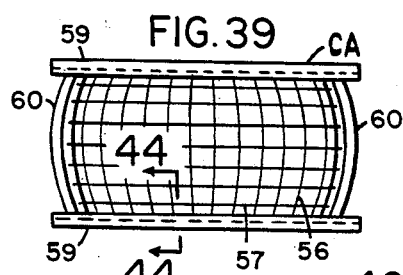
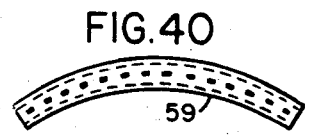
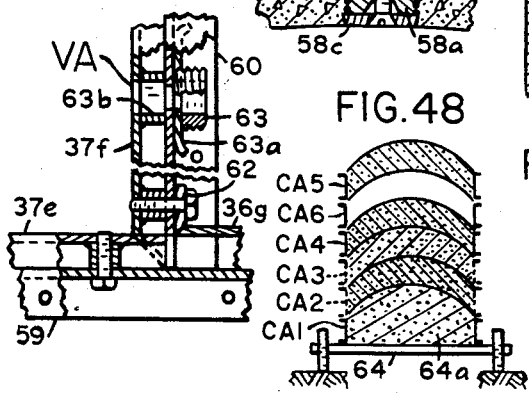
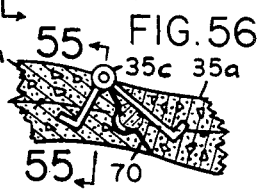
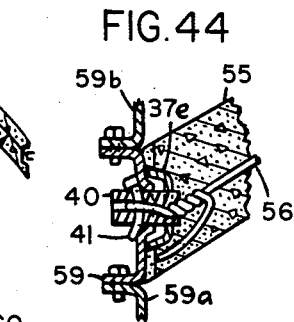
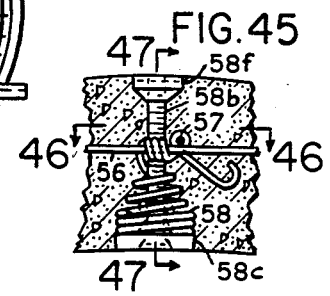
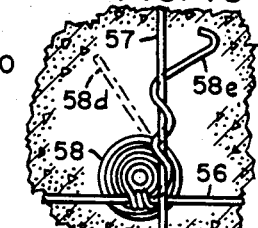
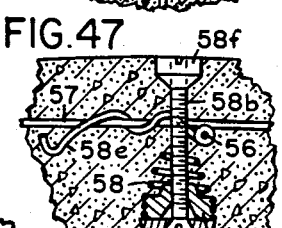
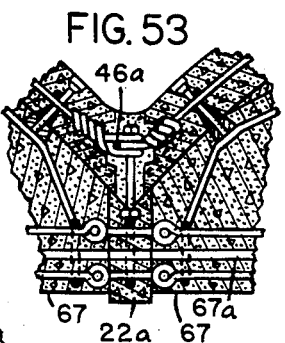
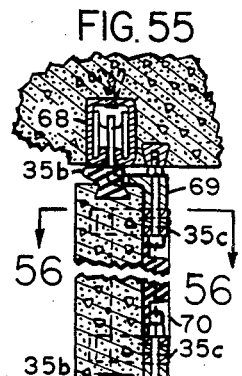
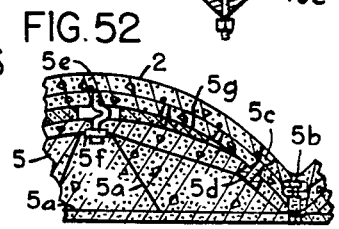
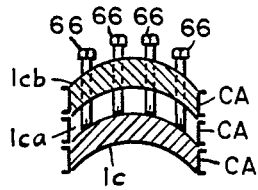

Aug. 4, 1959 P. GRAHAM 2,897,668
BUILDING CONSTRUCTION
Filed Dec. 1, 1951 4 Sheets-Sheet 4
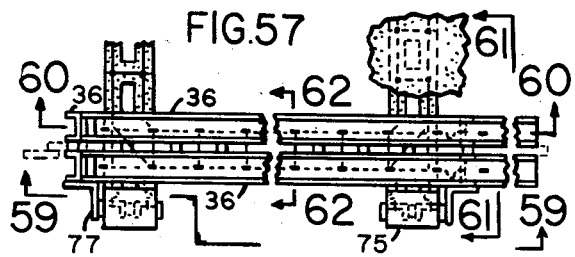
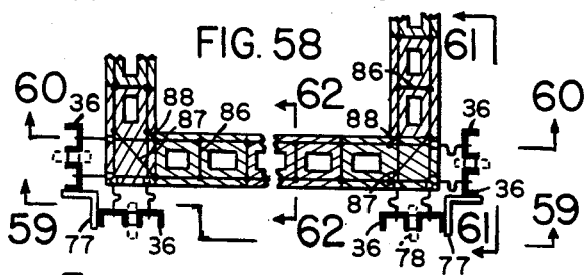
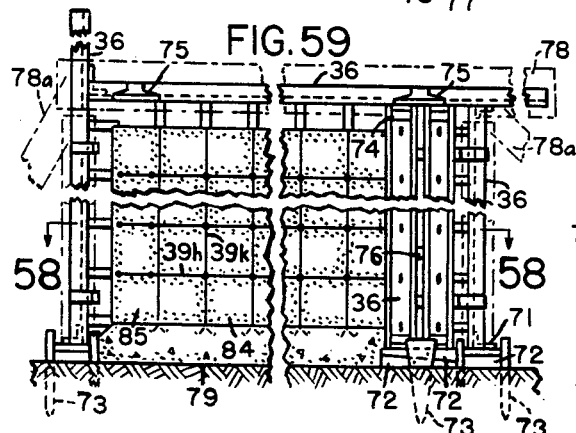
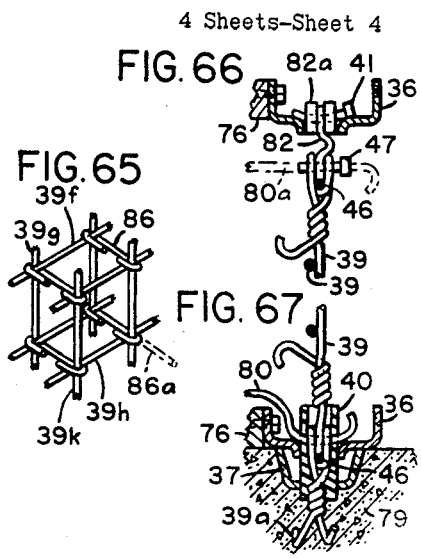
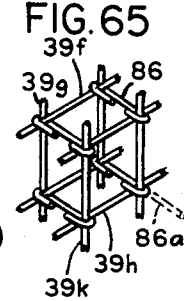
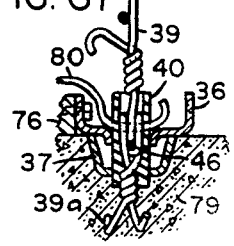
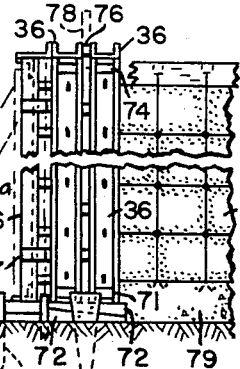
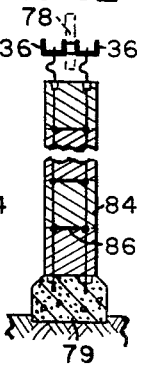
INVENTOR.
PHILLIP GRAHAM
BY William J. Ruano
ATTORNEY

United States Patent Office

2,897,668
Patented Aug. 4, 1959

2,897,668

BUILDING CONSTRUCTION

Phillip Graham, Pittsburgh, Pa.

Application December 1, 1951, Serial No. 259,354

1 Claim. (Cl. 72—40)

This invention relates to building construction including cementitious type and plastic panels or sections which can be readily interlocked or bonded together to obtain an integral building shell or the like, and relates also to the method and apparatus for casting such sections. This invention is a continuation-in-part of my co-pending application Serial No. 780,724, filed October 18, 1947, entitled Building Construction and now abandoned. This invention particularly refers to units, either with or without reinforcing, such as large precast concrete sections, which are generally reinforced, and to reinforcing for concrete block construction.

The designs and methods shown and described hereinafter are useful for building low-cost, durable houses, barracks, farm buildings, and other structures to prepare for possible future wartime conditions and to meet present-day economic conditions.

Reinforced concrete has more favorable characteristics for modern building requirements than other readily available materials. There have been sufficient improvements and developments in concrete construction in recent years, in addition to the improvements shown herein, to warrant its use more widely in small building construction. Most basic designs, building products, and methods of construction for houses being built today are largely the same as those that have been used traditionally for a hundred years or more. Utilities have been added, but the basic structure has not been changed materially to keep in pace with new developments. Well braced buildings constructed of wood can resist side pressure, but they are not fire-safe. Most small buildings having masonry walls are not designed to resist high side pressure, nor is the floor and roof framing usually made of fire-safe material. At short range, an atomic blast would crush and/or burn most of the present day conventional houses and other small buildings.

An object of my invention is to provide a strong, low-cost, durable, fireproof shelter able to resist destructive forces resulting from catastrophes, including atomic explosions, and which will resist deterioration from exposure to the elements.

Other objects of my invention are to provide substantially improved building products, equipment, designs, and methods which will become more apparent from the following description taken with the accompanying drawings wherein:

Figure 1 is a plan view of a typical small building embodying the principle of my invention.

Figure 2 is an elevation, taken along line 2—2 of Figure 1.

Figure 3 is an elevation, taken along line 3—3 of Figure 1.

Figure 4 is an enlarged fragmentary sectional view, taken along line 4—4 of Figure 1.

Figure 5 is an enlarged fragmentary sectional elevation, taken along line 5—5 of Figures 1, 2, and 6.

Figure 6 is an enlarged fragmentary sectional view, taken along line 6—6 of Figures 3 and 5.

Figure 7 is an enlarged fragmentary sectional elevation, showing in detail hood contacting closed shutter of dormer "W" shown in Figure 5.

Figure 8 is a fragmentary plan view of a modification of the building shown in Figure 1.

Figure 9 is a sectional elevation, taken through the width of another modified form of building.

Figure 10 is a fragmentary sectional elevation, taken along line 10—10 of Figure 9.

Figures 11, 12, 13, 14, 15 and 15A are fragmentary sectional views taken through building shells, showing various arrangements for using typical precast sections.

Figure 16 is a plan view of a form assembly which is used to cast a concrete section.

Figure 17 is a sectional elevation, taken along line 17—17 of Figure 16.

Figure 18 is an enlarged fragmentary plan view, showing a corner of the concrete section and form assembly.

Figure 19 is an enlarged fragmentary elevation, taken along line 19—19 of Figure 16.

Figure 20 is a fragmentary plan view, taken along line 20—20 of Figure 19.

Figure 21 is an enlarged sectional elevation, taken along line 21—21 of Figures 16 and 19.

Figure 22 is a fragmentary sectional view, taken along line 22—22 of Figure 19.

Figure 23 is a detail of an end of wire reinforcing used in connection with the concrete section shown in Figure 16.

Figure 24 is an anchor type wire reinforcing, which is a modification of that shown in Figure 23.

Figure 25 is a fragmentary sectional view, taken through a joint of a concrete building shell. It shows the typical splice with reinforcing.

Figure 26 is a fragmentary sectional view, taken between reinforcing strands of a concrete building shell.

Figure 27 is a sectional view, showing a modified form member.

Figure 28 is a fragmentary elevation of a modification of the form assembly shown in Figure 16.

Figure 29 is a fragmentary plan view, taken along line 29—29 of Figure 28.

Figure 30 is a fragmentary sectional elevation, taken along line 30—30 of Figure 28.

Figure 31 is a fragmentary sectional view, taken along line 31—31 of Figure 28.

Figure 32 is a perspective view, showing a modified reinforcing unit.

Figure 33 is an exploded view of an anchorage for a modified reinforcing unit.

Figure 34 is a side view of a straight, corrugated, precast panel.

Figure 35 is a side view of a curved in length, corrugated, precast panel.

Figure 36 is a side view of a corrugated, precast panel having a tapered width.

Figure 37 is a side view of a corrugated, precast panel of tapered thickness.

Figure 38 is an enlarged sectional view taken along lines 38—38 of Figures 34, 35, 36, and 37.

Figure 39 is a plan view of an assembly of forms and reinforcing useful for casting a section such as shown in Figure 35.

Figure 40 is an elevational view of a form side member shown in Figure 39.

Figure 41 is an elevational view of a form end member shown in Figure 39.

Figure 42 is a transverse sectional view through a modified two-piece form member.

Figure 43 is an enlarged, fragmentary plan view of a corner of the form assembly shown in Figure 39.

Figure 44 is an enlarged, fragmentary sectional elevation showing forms and precast section with concrete in place, and taken along line 44—44 of Figure 39.

Figure 45 is an enlarged, fragmentary sectional view through a present section showing a chair for supporting the reinforcing.

Figure 46 is a fragmentary sectional view, taken along line 46—46 of Figure 45.

Figure 47 is a sectional elevation, taken along line 47—47 of Figure 45.

Figure 48 is a sectional elevation, showing an arrangement for casting curved or corrugated sections.

Figure 49 is a sectional view of adjacent form members, showing a bolting arrangement for securing them together.

Figure 50 is a sectional elevation, showing a method of coring holes while casting precast sections.

Figure 51 is an enlarged, fragmentary sectional view through a side splice of corrugated precast sections.

Figure 52 is a fragmentary sectional view through a typical strut and building shell.

Figure 53 is a fragmentary sectional view through the shell of the building and typical supplementary members.

Figure 54 is a sectional plan view, showing a folding partition.

Figure 55 is an enlarged sectional elevation, taken along line 55—55 of Figures 54 and 56.

Figure 56 is an enlarged sectional plan view, taken along line 56—56 of Figure 55.

Figure 57 is a fragmentary plan view, showing reinforced concrete block construction.

Figure 58 is a fragmentary sectional plan view, taken along line 58—58 of Figures 59 and 60.

Figure 59 is an elevational view, taken along line 59—59 of Figures 57 and 58.

Figure 60 is a sectional elevation, taken along line 60—60 of Figures 57 and 58.

Figure 61 is an elevational view, taken along line 61—61 of Figures 57 and 58.

Figure 62 is a sectional elevation, taken along line 62—62 of Figures 57 and 58.

Figure 63 is a perspective view, showing an intermediate concrete block.

Figure 64 is a perspective view, showing a corner concrete block.

Figure 65 is a fragmentary perspective view, showing block reinforcing.

Figure 66 is a fragmentary sectional elevation, showing the reinforcing arrangement at the top of a block wall.

Figure 67 is a fragmentary sectional elevation, showing the reinforcing arrangement at the bottom of a block wall.

Figure 68 is a fragmentary sectional perspective view, showing the reinforcing arrangement at the fixed end of the reinforcing.

Figure 69 is a fragmentary sectional, exploded, perspective view, showing the reinforcing arrangement at the take-up end of the reinforcing.

The structures shown in Figs. 1 to 15A inclusive relate in general to small buildings or houses. The principles would be, to a large extent, the same for larger buildings, except that very large arches would usually be less than 180°.

While various modifications are shown, these are not by way of limitation of the invention inasmuch as other designs can be readily devised incorporating the basic structural units to be described.

An economical building design, illustrated in Figs. 1 to 7 inclusive, has a small span arch and a strong shape. This rigid structure is designed for durability, comfort, and security. It is adaptable to any climate.

Structures built with this design would be attractive since its rib-like corrugations are similar to those in scallop type sea shells copied extensively for decorative use. The interior concave and exterior convex corrugated surfaces are pleasing to the eye because of the highlights and shadows that are formed by these surfaces when light strikes them.

The shell of the building carries its own weight. There is practically no material in the building structure that is not load bearing. Weight of the building is low compared to that for conventional masonry buildings.

The building design shown in Figs. 1 to 7 inclusive and its modifications shown in Figs. 8, 9 and 10 have thin corrugated shells made of precast reinforced concrete sections to insure the most economical use of materials. The reinforcing in adjoining precast sections is joined together at erection to obtain continuity in the reinforcing system. Reinforcing ties the walls and floors together. Reinforcing is a means of tieing precast sections together for quick, low-cost erection. The curved precast panel sections, which form the corrugated ribs, have a desirable section modulus to resist bending.

Where possible, the building designs shown utilize the concrete to best advantage, that is, in compression. Extensive use is made of arch roof and floor construction which does not have to depend on reinforcing steel, under normal conditions, and is less likely to collapse if fire should penetrate to the reinforcing. When mild steel reinforcing becomes very hot, its stress carrying characteristics are lowered. A high ratio of vermiculite in concrete acts as an insulator to slow the passage of heat, thus the reinforcing is protected.

The present corrugated arch construction uses less concrete for constructing a given span, than would be used in building conventional flat concrete spans since normally all concrete in an arch is working in compression. Arched members with small depth are subject to slight bending from unequal loading, such as those caused by high winds. The depth of corrugations in these buildings is the depth of the arched members, therefore these corrugated arches would have little tendency to bend compared to non-corrugated arches of the same thickness. Ample head room for the story below is offered by the arched roof or ceiling at low cost.

The corrugated arched structures shown in Figs. 1 to 10 inclusive offer considerable protection from fire and violent external forces such as wind pressure from hurricanes; pressure from fresh water and tidal floods; pressure from explosions, including atomic; snow loads and avalanches; localized impact loads such as that from missiles, driven by the force of explosions or hurricane winds; impact from falling trees, etc. The building shell has a surface which is shaped to deflect forces, and it has a strong shape to resist forces. By means of the shape, weight and reinforcing of the corrugated arched shell, the present building would resist violent internal air pressure on the shell caused by explosions, fire, hurricanes, etc. The building shell has strong characteristics to resist stresses caused by soil failure under a part of the building and to resist damage caused by excessive vibration, such as that from movement of passing trains, trucks, or by earthquakes. These arched type corrugated concrete buildings can be covered with soil for security and camouflaging. In this manner protection can be provided for people and vital industries in wartime. Military barracks and other military buildings of this type could be thus protected. The building resists deterioration from contact with the soil. The soil, particularly when moist, and concrete offer protection from destructive forces, including harmful gamma rays emitted by atomic explosions.

Since all large concrete masses are likely to develop cracks from loadings, shrinkage in curing, or expansion and contraction caused by temperature changes, reinforcing metal is used generally in these structures for strength. Its bonding connection to concrete, prevents cracks from becoming large and objectionable. Large cracks fill up with moisture and other foreign matter and thus freezing of moisture causes spalling.

The arched buildings shown in Figures 1 to 10 inclusive could be very long and yet the roofs and walls of this corrugated arch construction do not require expansion joints since there is little tendency for these corrugated sections to crack excessively from expansion and contraction. This is due to the fact that the arch span can bow outwardly or inwardly to allow for expansion and contraction in the width of building, and the corrugations can bow outwardly or inwardly to take care of expansion and contraction along the length of the building when suitable anchorage is used. No serious cracking is caused by this slight bending. Floors could have expansion joints, although they have relatively little expansion and contraction compared to the exposed superstructure. A corrugated shell can expand and contract to suit floor expansion and contraction. Rain or cold weather causes the building shell to cool, thus contracting the curved sections, forcing any cracks shut and thereby squeezing the moisture out before any possible freezing temperature is reached. The compressive force of the arch tends to keep cracks closed. Much of the reinforcing in these corrugated arch designs is of a secondary nature. It is used to take care of slight loads and to prevent excessive cracking from temperature changes. When very little reinforcing metal is available, such as during wartime, much of this corrugated and arched construction could be made with just a little reinforcing around the edges of precast sections to anchor and tie adjoining sections together. This construction would be relatively strong and also economical. In extreme emergencies, the corrugated arch construction could be used to a limited degree without any reinforcing because most of the loads are in compression and the concrete is able to resist. Although steel wire and rods are the usual type of reinforcing used with concrete, fibrous glass and open meshed fabric made with thread of this type material, can be used to reinforce the precast concrete sections. It has the advantage of being non-corrosive. It is durable and fire resistant. It may be available when metal is not. In emergencies, such as wartimes, strips of wood or other materials could be used for limited reinforcing in this type of construction.

The outside of arched corrugated concrete shell provides a good continuous drainage surface. There are no eaves or sharp ridges to require sheet metal flashing. Valleys in the corrugated shell can handle excessive rainfall. The force from ice forming in the valleys is resisted and deflected by the strong shape of the shell.

These arched corrugated shelled concrete structures repel water penetration better than do most conventional masonry buildings. In addition to not having objectionable open cracks for water to penetrate, suitable concrete aggregates are used to give a water-resistant concrete, in addition to surface waterproof coatings. Some durable surface waterproof coatings form an attractive appearance, which can be used, thus eliminating need for any additional finish coating or veneering.

These corrugated shelled concrete structures can be insulated at a low cost. The thin shells require little vermiculite or other suitable insulation to make them desirable for both thermal and sound insulation. Vermiculite is exploded mica. It is light in weight, durable, fire-resistant, and resilient. Nails can be driven into concrete which has a large proportion of it. It is not effected by moisture. Vermin and rodents cannot destroy it. It also cuts down the dead load of the structure.

The present concrete buildings, with doors, windows and other openings sealed, could have fresh air intakes which can be closed against gas attacks in wartime. The occupants could use oxygen until the gas had cleared. Also, a sealed building seals out germs for a short time while countermeasures are being taken against them. This would be necessary in bacteriological warfare, when bacteria is sprayed or dusted from planes. Sealed building could also be fumigated with little effort to kill vermin. These concrete building shells could be cleaned inside and outside with water and mild cleaning substances, without damaging the structures. With accurate precast concrete construction, the following building members could be eliminated: door frames, window frames, wood trim, and wood flooring. This would make a more economical, fire-resistant, and sanitary building. Vermin hide in and behind wood members. Concrete floors could be covered with resilient asphalt tile, paint, or other suitable finishes. No plastering or stucco is required with these smooth precast panels. Much plastering is roughened now for an artistic finish, and therefore, a relatively smooth wall surface is not objectionable. No wallpaper is used on these sanitary washable walls. Reinforced concrete panels can be cast with surfaces veneered with stone, brick, tile, etc. Ornamental designs and lettering could be molded into the panels.

If a permanent type waterproofing with an attractive finish were used, very little, if any, highly volatile paints would be required. This would help to maintain a fire-safe building. There is no exposed metal on the building except for the door and window hardware. Thus little or no painting is required for rust prevention. Corrugated concrete structure is durable, as it is, or can be made resistant to deteriorating damage from heat, cold, moisture, fire, smoke, soil, fumes, vermin, rodents, and vandals including those from possible invading armies. Such a building cannot gainfully be torn down and moved by thieves since the joints of the sections are bonded together. Only by demolishing the entire building shell can it be torn down. There would be low cost maintenance for good concrete construction. These durable concrete buildings permit savings on fire, flood, explosion, and wind insurance. Taxes would also be lower on these low cost buildings, than on buildings of the same size that cost more to build.

The time needed for designing, obtaining building materials, fabricating and erecting this type of construction would be short. All the aggregates can be stocked for quick fabrication, thus eliminating costly delays for material delivery. Standardized forms, reinforcing, and methods of using them all tend to standardize the panels and the type of construction, thus making it more economical to use. Standardization allows low cost, quantity production, and fewer errors in designing, fabricating, and erection. Most of the brain work goes into designing the standardized forms and the structure. Semi-skilled labor could be used to make and erect precast construction. If, during wartime, a need were to arise for quick construction of buildings of this type for shelters, unskilled, aged, handicapped, and frail labor could help to build it. No heavy manual work is necessary with this method of concrete construction.

A small low cost crane would be used to lift light precast concrete sections in small building construction. Forms are lightweight and could be handled manually to a large extent, or with a crane to suit conditions. A one or two-man crew, using a light crane, could erect a small building. Farmers and other groups could make and erect their own precast sections in off seasons or during bad weather.

If the concrete panel sections are not cast on the job, it could be a relatively noiseless type of construction. This is highly desirable in many locations, such as health and vacation resorts and quiet zones near hospitals. When speed is required in erection, work can be carried on night and day without much noise. There would be less costly delays in erection due to the weather. The erection of reinforced concrete panels can be carried on in wet or cold weather and the joints grouted at a later suitable time. Low cost radial falsework could be used for the erection of the arches, it could be movable along the center of the building to simplify the erection.

The corrugated shelled building, shown in Figs. 1 to 7 inclusive, has corrugated precast sections four feet wide and not much over eight feet long for ease in handling. The depth of corrugations is generally constant, except for the matching segmental end sections. The depths of corrugations could be modified so as to increase or taper the depth to suit the loading conditions. Panel sections are suitably tapered in width and thickness near openings or other places requiring increased section to take the loads, or additional sections are added for strength, by laminating. The sides of the adjoining corrugated sections form a V shape, as shown in Fig. 4, which tends to act as a rib, giving strength to the shell. This V shape would take compression or tension. During erection, reinforcing can be laid in this V joint to add to its tension value and to prevent excessive cracking.

Structural panels are described in general here and will be described in detail later. As shown in Figs. 1, 2, and 3, precast corrugated or curved width panel sections 1 are straight in a vertical direction and the width is curved, to a standard curvature, established for the whole building design. The cross section of these curved width panels is similar in shape to a crescent. There is a means for joining all adjacent sections, as shall be explained in detail later. A typical side splice or joint is shown in Fig. 4. An end joint would be similar to that shown in Fig. 25. Reinforcing pins and concrete grout, join the adjacent panels together. The splice shall be described in detail later. Dished precast corrugated or curved width panel section 2 is curved in length as it is part of the roof arch and it has the standard curve in width, the same as for panel 1. Dished precast corrugated or curved width panel section 3 is part of a segment, and it is similar to panel 2. Dished precast corrugated or curved width panel sections 3a has a segmental shape. Dished precast corrugated or curved panel section 4 has a tapered thickness. It is thickened to compensate for the loss of section at the vent opening. Precast segmental cross strut or tie members 5 are used when stiffening is required, for instance along a ridge. Precast dished corrugated panels 6 and 7 are modifications of panel 2. They have the same curved width as panel 2, but they have skewed sides and the side radii differ to suit the step-down of roof arch. Dished doors 8a and 8b are for an opening for a vehicle. Precast curved panels 9 are a modification of panel 2. Door 10 should be strong and durable. It should swing out, to enable it to resist external forces and to yield to high internal pressures. Smoke, fumes, and air could pass through precast capped vent or chimney 11. Concrete slab 12 is the foundation footer and floor combined. A bed of crushed stone with a topping of asphalt or tar, below slab 12, could prevent the capillary attraction of moisture from the soil to the concrete. Precast concrete gutter 13, around the building base, takes the water run-off from the roof and carries it to a suitable disposal outlet. The groove in gutter 13 is curved to divert rushing water back towards the building. Thus it safeguards against the erosion of adjacent soil by preventing water from rushing across and leaving the gutter. Where freezing temperatures are possible, the gutter is made in two pieces to allow one piece to rise if the water in the gutter freezes.

The dormer assemblies W are shown on buildings in Figs. 1, 2, and 3, and are shown enlarged in Figs. 5, 6, and 7. They offer security, comfort, and allow for daytime illumination from sunlight and they allow visibility through their openings. The dormer W includes the hood, shutters, and window. Precast dormer roof or hood 14 and precast shutter sections 15a and 15b are overhanging precast reinforced concrete shells. Vermiculite in the concrete of the hood and shutters makes them light in weight and makes them thermal and sound insulators. These dormer sections may be of laminated construction (not shown) similar to that for panels which is described later. These members are dished and thus strong. Hood 14 is shaped similar to shutter sections 15a and 15b. They nest together when the shutters are open. Shutter shaft 16 is supported by hood 14 and bearing 17a which is on window strut 17. Shutter sections 15a and 15b pivot on shaft 16 to open or close. Window 18 is supported by window strut 17 and the concrete shell surface around the window opening. Only a fragment of a suitable special window 18 is shown. Hood 14 and shutters 15a and 15b are the parts that are new and useful. They shed rain and other elements. They are attractive in appearance. Hood 14 strengthens the shell structure around the window opening.

Figures 5 and 6 show shutters when open with full lines and a dot-dash outline shows the closed position of the shutters. Window hood 14 and shutter sections 15a and 15b have resilient seals to make a tight seal and cushion between adjacent sections.

Figure 7 shows an enlarged fragment of hood 14 and shutter section 15b with shutter section 15b in closed position. Seal-cushion 19a is held by a dovetailed groove in hood 14. In Fig. 7, seal-cushion 19a is shown closing the gap between shutter section 15b and hood 14. The seal-cushion acts as a cushion between these sections when they are closed. A similar seal-cushion, 19b, is inserted in a dovetailed groove in the lower end of shutter section 15b. It seals the opening between shutter sections 15a and 15b and also acts as a cushion between them when they are closed. These seals, 19a and 19b, maintain a seal for any position of shutter sections 15a and 15b. A similar seal-cushion, 19c, in a dovetailed groove in the lower edge of shutter section 15a, cushions and seals shutter section 15a to the shell of the building when the shutters are closed. The shutters can be closed, or partially closed, to insure privacy and to keep out undesirable elements. Closed, sealed shutters keep out air including wind, moisture, fumes, dust, heat, cold, sound, smoke, fire, insects, vandals and other possible intruders, poisonous gas in warfare, germs in bacteriological warfare, missiles carried by the forces of explosions and hurricane-like winds, and some of the gamma rays from atomic blasts.

The weight of the shutter sections 15a and 15b would have a tendency to close them. They are restrained however by chain 20, which is connected to the upper edge of shutter section 15a. It holds shutter section 15a in position. An offset on shutter section 15a bears against an offset on shutter section 15b to maintain closed, or partially closed, shutter positions. A hole in the building shell above the window opening allows chain 20 to pass through. A counterweight (not shown) along with suitable pulleys (not shown) attached to chain 20 could offset the load of the shutters. A block and tackle or winch device (not shown) which would open and close the shutters with little effort could be incorporated. Fusible links, which melt when heated highly are suitably placed in chain 20. They would provide safety, allowing the shutters to close automatically in case of a fire inside or outside the building. One fusible link near shutter section 15a on the outside of window opening would melt from the heat of an exterior fire; another fusible link near the other end of chain 20 would melt from an interior fire. An electrical control circuit could be another means to regulate the movement of the shutters. Fire or electric current would melt a fusible link or, alternatively, would actuate a solenoid to quickly close the shutters. Excessive wind pressure, heat, or rain could be the means to trip electric relay devices which directly close the shutters. A motorized winch on the shutter chain could be operated by a manual or automatic switch affecting the shutters in one dormer or more. Intense light from an atomic bomb could act on a photoelectric cell or other radiation sensitive device which would trip the electric circuit and either melt the fuse or start a motor which would close shutters rapidly. The building shell and shutter could withstand some atomic bomb effects, and would thus protect the occupants from the intense heat, pressure and some of the harmful gamma rays. If the building is covered with protective soil 21 as shown in Fig. 3 by dot-dash lines, harmful atomic gamma rays could be screened out, more so if the soil 21 is very moist. Soil 21 would act both as a camouflage and a protective shield. It would stiffen the building shell against bending from uneven pressures, such as that from an explosion. Soil 21 would act as a cushion from the force and concussion of exterior or interior explosions. Stairs or a ladder, with a hatch opening to the roof, could be used with this wartime protective arrangement. An opening similar to vent 11 could be used as a hatch opening, with removable vent cap used as a hatch cover. If houses are heavily banked outside with soil or sand a few feet above the floor line, or if houses are built with the floor level a few feet below the outside ground level, the occupants could lie on the floor, adjacent the wall closest to possible bombing targets. Here soil outside of the building would screen out harmful gamma rays. It is assumed that only buildings off from the center of the blast would survive, and thus gamma rays would be passing nearly horizontal. If the building was not protected above the ground level, the gamma rays would pass through it, but clear the occupants lying on the floor. Buildings could be built below ground level by digging a trench and, after erection, covering the surface with soil level with the terrain. Buildings with durable sealed doors and shutters could be covered with protective soil for a long time in a war emergency. Modified structures may have a hollow double shell which can be filled with water, sand, soil, etc., for screening out gamma rays. Figs. 11 to 15A inclusive show some such hollow double shell arrangements. Hollow double shelled buildings may have double glazed windows with the space between the glass sheets filled with water to screen out gamma rays.

Figure 8 is a fragmentary plan of a modification of the building shown in Fig. 1. It shows how offsets can be made with corrugated arch construction. Cross struts 5 and ribs 22b, which are similar to ribs 22a shown in Fig. 53, carry arch thrusts. Ribs 22a can be added, fastened below the V splices, to increase the depth of long arch members. Three small modified panel sections would be used at the peak above ribs 22b.

Figure 9 is a sectional elevation through a typical two-story concrete building which has an arched roof and a corrugated shell of precast sections. It is a modification of the building shown in Fig. 1. It may have one or two stories above the surrounding land surface, or it may be all below the ground to insure protection in wartime. The roof arch is similar to that in Fig. 1. A suspended ceiling or floor is shown. It is especially suitable for larger spans. It is made of precast concrete slabs 23, which are hung from the roof arch by means of hangers 23a. This arched roof allows for more head room on the second floor, and thus more usable floor space than do most sloping-roofed houses. The arch in the roof could be flat, similar to the arch under the second floor. Thus it would maintain head room, while keeping the ceiling low at the center.

In Figure 9, the roof arch, of precast corrugated shapes, is supported by vertical corrugated precast walls. Modifications in the structure such as vertical ducts for carrying air or piping (not shown) may be made with various arrangements. In such an arrangement a flat precast panel section 24b could be placed across the width of a curved panel, similar to the arrangement shown in Fig. 13. Vent holes could be located in such flat wall sections. Walls could be hollow, so that fresh air and heat in them could vent and heat the building. Windows for vertical walls may be similar to those for conventional flat walls, with segmental members 5 used to make a suitable framing above and below the window openings. Sliding or folding shutters may be added. They may be curved, similar to the width of the wall. If they are of a sliding type, they could be counter-weighted and controlled similar to those in dormer W.

Reinforcing in precast concrete floor sections tie the sides of the building together. The strong shape of precast panel sections 1a and 4a prevent the walls from buckling. Panels 1a are similar to panels 1. Panels 4a are tapered in thickness, as are panels 4. The walls rest on concrete footers 12a. They are connected with reinforcing, as are all members.

The flat arch, supporting the second floor, has precast corrugated concrete sections 2a curved to a long radius and precast sections 2b curved to a short radius.

Figure 10 is a sectional view through the second floor framing. Flat reinforced concrete floor sections 24 would likely have openings 24a suitably spaced for air 29 to pass for heating, cooling, and ventilating. Sections 2a and 2b would also likely have air exhaust holes 2aa suitably spaced. Vertical precast concrete joist members 25 and 26, along with sections 24, 2a, and 2b, form duct-like spaces which can be used for heating, ventilating, utility piping and wiring, or they can be filled with insulating filler, used as storage space for solids, liquids, or gases, or left as dead air spaces. If some of these duct-like spaces are used for heating, venting and/or air-conditioning, the hot air systems would have the advantage of permitting the use of the same, or adjoining ducts, for heating or air-conditioning. A circulating, sealed-in, hit air heating system using some of these duct-like spaces would be clean and safe from smoke and fumes. A sealed-in circulating hot air system has no unsightly members, nor does it use valuable floor space. The ducts could be cleaned out with water, etc.

A concrete floor system gets warm slowly and cools slowly, not dissapating heat quickly. Even rising heat from the entire floor would eliminate excessively dirty wall areas, such as those near radiators and large hot air vents. Large floor areas can be heated economically since the heat is efficiently distributed by this system. Valves (not shown), suitably located, can be used to regulate and shut off the air from all or part of a room. This duct system of heating, ventilating and air-conditioning would not create excessive drafts, which are often objectionable, especially in air-conditioning. When concrete floor is heated by the ducts below, cold air picks up heat and rises and thus it heats the zone of space immediately above the floor, which is highly desirable for the comfort of the occupants, particularly small children. This heating system is more practical than systems which have one or two outlets that insert warm air into the room in a small localized space. The heat can escape to the ceiling without heating much of the space nearer the floor. Ventilating ducts may be along the side of these heated ducts in a sealed-in circulating heating system. The duct wall, which would be common to a heating duct, and the ventilating duct, would heat up. This duct wall would induct heat into the cool, incoming, fresh, ventilating air, which enters the rooms from the ducts, through many small holes such as 24a, cored in floor slabs above the ducts. This heated fresh air helps to heat the room rather than to chill it. With this system, the windows could be sealed shut. The interior could be kept cleaner by filtering fresh air at the intake system, which could be connected to an air-conditioning unit for cleaning, and/or cooling air. In modifications, a hot-air furnace and an air-conditioner that are never used simultaneously could use the same ducts and blowers. The fresh air could be warmed as it passes the furnace. This modified system would not be as economical to operate for heating as would a sealed-in circulating hot air system.

Preheating fresh air would reduce heating costs. There could be small holes in the ceiling leading to exhaust ducts in a double shell floor or roof system. Vertical ducts for heating and conveying air can be made of wall sections as will be described later. Vermiculite is used in floor members where it is required for insulation. An arched ceiling causes hot air to flow to the arch peak, thus ventilating air is kept in motion to the ceiling vents at low cost.

The lower floor of the building shown in Fig. 9, is similar in construction to the second floor. A sectional view through it would look similar to Fig. 10. Floor panels 24 would have vents 24a. Corrugated precast panel sections 1b would be similar to panels 1, although they would not have any vent holes. For long spans, sections 1b could be reinforced by the addition of similar shorter corrugated sections being laminated to them, as are cover plates in structural steel construction. There would be rectangular precast concrete joists, similar to joists 25 and 26. Joists, with sections 24 and panels 1b, would form duct-like spaces. These spaces used as floor ducts would have openings (not shown) suitably located to connect to ducts 27a, 27b, and 28, and also vertical ducts to the second floor (not shown). Ducts 27a, 27b, and 28 carry utility piping and wiring, as well as heating, cooling and ventilating air. Precast concrete sections forming ducts 27a, 27b, and 28 also help to support the floor structure. Removable covers would make the ducts accessible. The ducts could be large enough in general to admit the workmen.

The structures shown in Figs. 1 to 10 inclusive may have folding partitions, shown in Figs. 54, 55, and 56, for converting space as will be described later.

The building shown in Figs. 9 and 10 may be built as a one story structure with the second story added at a future time. With this one story arrangement, future second floor would act as a flat roof.

Figure 11 is a fragmentary sectional view through a double shell of a structure made of precast sections embodying the present invention. The space between the corrugated precast concrete panel sections 1c could be filled with insulating material 31. Or the space could be used as ducts for heating and ventilating air, for pipes and wiring, storage space, or a dead air space. Bolts could tie the double shells together at the side splices. Vent holes could be made in the inside shell for heating or ventilation. For strength and insulation, the spaces between panels 1c could be filled with water, sand, rock, concrete, soil, etc. Sand and water are especially good barriers against gamma rays. The centers of these shell panels 1c could be tied together with tie 30.

A single shell could be built first, if suitable connection parts are incorporated so the second shell sections could be added at a later period. Panels 1c are similar to panels 1 and 2. The arrangement shown in Fig. 11 could have a wide gap between the two shell systems which would require long tie rods to hold the shells from spreading apart, and a filler, such as soil, sand, rock, concrete, or liquid between the shells would prevent them from coming closer together. This design is suitable for tanks, retaining walls, seawalls, etc.

In modifications of the design shown in Fig. 11, a flat section 24 (not shown) can be placed across the chord of sections 1c to separate the two shells and to divide the wall cavity into two segmental spaces. This arrangement would have many possible uses, such as for two ducts, or a duct and an insulated or solid filled space.

Figure 12 is a fragmentary sectional view through a double corrugated shell of a structure. Its use would be in general the same as was described for the one shown in Fig. 11. Insulation 31 could be used between sections. The members 32, which tie the two shells together, could be intermittently or continuously spaced depending upon the strength desired and the design requirements for the use of the space between sections 1c.

Figure 13 is a fragmentary section through a building shell. It is a triple sectional shell arrangement. It has two laminated curved width precast concrete panels 1ca and 1cb. A flat width precast panel, 24b, spans their chord. Laminated shell construction could be used to reinforce a shell locally or continuously or to combine a strong panel with a weaker one which contains insulation such as vermiculite. One thickness of shell panel construction could be built, and at later periods, the second and third shell could be added. Panels 24b could be omitted in modifications. They would be used for a flat wall finish or space for insulation 31, or for a duct. A single or double curved outer shell, with flat panels 24b, would make a strong building shell. A thin vapor barrier material and/or a suitable material as a barrier of gamma rays from atomic blasts, etc., could be put between sections 1ca and 1cb.

This arrangement, shown in Fig. 13, could be used to a large extent in the same manner described for the arrangements shown in Figs. 10 and 11. A modification of the arrangement shown in Fig. 13 may have members 32 (not shown) separating curved width panels 1ca and 1cb from straight panels 24b. Laminated panel sections 1ca and 1cb may be connected around their perimeters with their reinforcing connections. When additional connections are required, holes can be cast into the panel face to allow intermediate bolting. This coring of intermediate holes is shown and described later on. Holes could also be drilled through the precast panel surfaces for additional connectors.

Figure 14 is a sectional view through a double shell of a structure. It would be particularly suitable for a wall, providing sound and thermal insulation. In sound-proof walls with two shells, the two shells are often not connected to each other, but to the floor and ceiling. The space between panels 1c is filled with insulation 31, or could be used for other purposes, similar to that described for other double shelled arrangements. This type of a wall may have panels 1c joined with members 34, if it is desirable. Members 34 could be either continuous or spaced intermittently. The arrangement, with members 34 added would make a strong, narrow, double building shell. The gap between the two shells could be varied from almost zero to any larger size, with members 34 to suit.

In modifications of the design shown in Fig. 14, flat sections 24 (not shown) can be placed across the chords of sections 1c to separate the two shells and to divide the wall cavity into segmental spaces. This arrangement would have many possible uses, such as for ducts, and/or solidly filled space.

Figure 15 is a fragmentary section through a double shell of a structure. It could be used similarly to the construction shown in Figs. 10 and 11. It is a serpentine or corrugated arrangement of sections. It could be used in wall or roof construction. A single shelled structure could be built, and at a later time the second shell section could be placed. Members 34a act similarly to members 34. They could be omitted for a soundproof wall. Insulation 31, or other features, which were described for other double shells can be used in the space between the shells. The gap between shells may be almost zero, to allow for a thin sheet or coating to make a suitable vapor barrier or other insulator. Due to the shape of these panels 1c, which is thicker radially towards the center, a single corrugated or serpentine shell is an effective means of making a strong shell with little material.

Figure 15A is a modified serpentine or corrugated double shell. It has an advantage over the double shell shown in Fig. 15 in that it is a narrower overall width, since it has shallower corrugations. A single shell could be built, then later on, the second shell section could be added, using members 34a and the insulating filler 31. Precast concrete panel sections 35 could be made with modified forms from those used for making sections 1c. The modification is made by using end forms that are fabricated by cutting the standard end steel form sections in half and welding and fastening the two right hand half pieces together, and the two left hand half pieces together. These precast sections 35 would not create panels four feet wide unless the metal forms are further modified. After having been used to mold these precast sections, the metal forms can be cut and welded back to their original shape. These sections 35 may be mounted in a horizontal position as siding. It may then be supported by other members (not shown). When suitably arranged in horizontal position, sections 35 would shed rain readily as the joints are diagonal.

Other arrangements of the precast sections from that shown in Figs. 11 to 15A inclusive can be made to suit conditions, such as a double shell (not shown) with convex surfaces of sections 1c facing each other with a gap between, which can be filled similar to that described for other double shell arrangements.

While I have shown buildings with corrugated precast construction, since it offers a means of making a very low cost, durable building, there are other modified types of structures not having corrugated arched design that may be built with flat and corrugated sections, such as a conventional modernistic rectangular structure. All the precast sections exposed may be flat panel sections.

A particularly suitable modified shaped structure that could be made with corrugated sections 3, etc., shown in Fig. 1, would be small dome shaped structures which would make strong shelters, etc., especially when placed underground. Groups of such structures could be connected by small arched corridors. They would offer security with a small amount of building material. Spherical shaped structures may be placed underground or underwater, as they may be designed to resist hydrostatic pressure and other loads.

Figure 16 is a plan view showing precast section 24, being cast with an adjustable edging form, assembly FA1. As shown in sectional elevation Fig. 17, assembly FA1 is assembled on a smooth horizontal surface, such as mat 45. This makes a neat finish for the underside of the concrete panel being cast. This mat 45 is preferably provided with a surface preparation so that the cured concrete will not stick to it.

Figures 18 to 23 inclusive, show details of assembly FA1 and a precast reinforced concrete section 24. Assembly FA1 by virtue of its adjustable edging can be used to form concrete panel sections of various widths and lengths in multiples of eight inches or other suitable units. The multiple is standardized for the construction on which it is to be used. Such a space unit as eight inches is a desirable size. It is used in the modular system of building dimensional standardization. The standard reinforcing spacing unit for this example is eight inches. Other standards having other spacings may be established. Eight inch spacing also is a suitable unit to use for concrete block reinforcing, which can be done with the help of some of the edge form sections and reinforcing. This will be explained farther on. If closer reinforcing spacing is required, the unit could be four inches, which is another modular unit. Four inch spacing allows for combinations, such as eight, twelve, and sixteen inches. For this typical example, concrete panels can be cast with assembly FA1 in any length or width, up to the limitations set by the length of the form members. In light concrete construction, ten feet would be a practical length for edging form section 36 since it can be cut without scrap from standard stock lengths of steel and is not too cumbersome to haul or handle. Many fabricating shops have shears and bending brakes ten feet in length to cut and bend these forms in the light sizes. If made of mild steel, form members in general, can be cut and welded to make any length desired. Since the connection at the adjustable end requires over four inches of material, ten foot edge forms 36 would allow the precast panel size to be nine feet, four inches at a maximum. Only a standard half-space is used from the corners of the panel to the first reinforcing strand so that when erected, two half-spaces on adjoining panels form a whole standard space.

In assembly FA1, Fig. 16, the main form members are four edge form sections 36. They may be a mild steel channel section, either rolled to shape, or formed otherwise in a fabricating shop. Plastic form sections may be used. Its cost would determine which would be most economical. Most of the panel sections to be cast would require a groove in the edge, so the panels can be keyed together with grout at the time of erection. Groove form sections 37 mold the grooves. A very small groove may be put in an otherwise flat panel edge for receiving a window, a door stop member, etc. Therefore, forms 37 should be of various sizes and shapes. They would not have to be strong enough to support any great loads. They could be made of steel or other suitable materials. A resilient section 37 is desirable since it can easily be stripped from the concrete and can be a molded shape of soft plastic or rubber. It can be curved easily to suit curved work, or made in other shapes to suit conditions. Solid wood or other materials may be substituted for this groove form. A groove form can be of solid precast concrete or solid plaster, which is expendable. The groove form 37 is omitted when it is desirable to have a smooth edge on a panel, such as at the end of a partition at an opening. In Figures 16 and 17, this groove form is used on three sides and is omitted on the fourth (right side) creating a plain edge on the fourth side.

In general, forms 36 and 37 are kept fastened together in length as a sub-assembly. They may be taken apart to make stripping easier. Only four special bolts 38 are inserted to join the four sub-assemblies together. Form sections may be tack welded together instead of being bolted together. Together they form assembly FA1. The same four bolts 38 are removed to strip the forms from the concrete panel 24. The bolts 38 fit into slotted holes that are placed at standard intervals for engaging wire or rod reinforcing 39. Thus it is a simple operation to assemble and dismantle forms.

Slotted holes 36b are punched in the web of edge forms 36. They are spaced the standard unit spacing, which is eight inches, for this example. These holes 36b not only serve to space reinforcing 39, but also serve as a means to hold the corner connections. The forms 36 are shown with reinforcing slots near the center of the web, as an example of reinforcing in a flat precast section of minimum thickness. These slotted holes 36b are spaced to suit their intended use. They are spaced off-center, in general, for thick floor slabs, or otherwise used as will be later described.

Groove forms 37 have slotted holes, spaced the same as for forms 36. These slots allow reinforcing 39 and bolts 38 to pass through form 37. An enlarged corner plan view, Fig. 18, shows an enlarged detail of the upper right hand corner of the assembly FA1. The head of special bolt 38 fits the slotted hole 36b, and bolt 38 is shouldered to fit the holes in the bent plate 36a. Plate 36a is bent to form a channel which has the same depth as form 36. It is welded to form 36. Bent plates 36a are notched to fit over half rounds 37c. Filler piece 37b is fastened to an adjacent form 37. It is used to fill the gap created when groove form 37 is omitted, as shown in Fig. 18. These edge form sections 36 could be relatively limber with the arrangement shown, since reinforcing 39 and the concrete tend to stiffen up and keep the assembled forms square and true. Forms 36 and 37 can be bent or bowed out a little. This bowing would be taken out by the pull of reinforcing 39. This pull would thus prestress reinforcing 39. If it is not desirable to bow forms for prestressing, spring-type washers (not shown) could be used under pins that hold one end of reinforcing to the form. But for the reinforcing 39 restraining it, the load from the fresh concrete being vibrated has a tendency to bulge out these light edge forms in length. The reinforcing is stretched, and thus prestressed by this action of the bowed forms and/or the spring washers and/or the load of the vibrated concrete. Prestressing reinforcing makes it more effective for carrying loads since it acts immediately when a load is applied to it because the reinforcing is taut and thus there is no slack to be taken up. As shown more clearly in Figs. 21 and 22, one end of the wire reinforcing 39 is twisted to form a single loop; the other end is twisted to form a double loop (see Fig. 23). Modified ends of reinforcing may be looped and welded similar to that for reinforcing in struts 67, shown in Fig. 53. The length of reinforcing 39 is always made in multiples of eight inches to conform to the standard spacing unit established. The distance between looped extremities must be accurate. The looped ends would probably be made in a shop, using jigs and machines for economical looping, twisting, and gaging of the lengths. This set-up for fabricating the wire would permit quantity production at low cost. The center part of the double loop, that is in the crotch, would generally be welded to prevent distortion of the loops. The need for welding these double loops under certain conditions will be explained later. This reinforcing 39 is so made that when the edges of the precast concrete panels are placed together at erection, it forms a clevis-like arrangement, as shown in Fig. 25. The single loop acts as a pin plate, and the double loop as the clevis. These looped ends are also used to connect the reinforcing 39 to the edging form sections 36. The loose ends of the reinforcing 39 are shown hooked to create a better anchorage, in addition to bonding of the reinforcing to the concrete.

A filler 40, preferably made of a soft rubber or plastic, is shown in Figs. 19, 20, 21, and 22. It could be an expendable plaster filler, cast onto wire in the shop, and broken when forms are stripped. Resilient fillers would give slightly when forms are hammered in stripping. If resilient fillers 40 were not available, as in times of shortages of material, such as wartime, a substitute, such as twisted and rolled oiled paper, could be inserted to fill this gap. Filler 40 is used with either a single or a double-looped reinforcing end. Resilient filler 40 takes up the difference in sizes of the single and double looped ends. It also makes a tight seal to prevent the fresh concrete from escaping or leaking through slotted holes in forms 36 and 37. The filler 40, shaped to fit slotted hole 36b, is kept from turning and thus keeps the looped ends of reinforcing 39 from twisting out of line. A modification (not shown) may have a modified resilient form, similar to form 37, with small holes to fit tight around wire 39 and a modified form 36 with smaller slotted holes to fit the loops on wire 39. Double loop would be a close fit and single loop would be a loose fit in slots. Filler 40 would be eliminated.

A curved pin 41, shown in Figs. 19, 21, and 22, holds reinforcing 39 and resilient filler 40 from pulling through the forms. Pins 41 are curved to enter the loops in the ends of reinforcing, as shown in Fig. 21. By curving these pins 41 to fit the rounded edge of slots 36b, they can be entered at an angle.

Pin 41 has a head and a curved shank. If these forms were going to be turned upside-down during handling, there could be a small hole near the end of the shank to receive a cotter pin which would prevent pin 41 from dropping out.

Diagonal bracing wire 42, shown in Figs. 16 and 18, is left in the assembly. The wire 42 is used to square-up the form assembly. It should have a turnbuckle at one end on the outside of the form, or other means of adjusting the wire. After assembly is trued, reinforcing wires 39 may be welded together to increase its effectiveness.

As shown in Fig. 22, forms 36 are fastened intermittently to forms 37 with bolts 43a. Spreaders 43 are fastened to forms 37. They prevent the over-tightening of bolts 43a from pulling forms 36 and 37 out of shape. Forms may be welded together.

In Figs. 18 to 22 inclusive, holes 36c are shown in the flanges of form sections 36 to allow bolting or pin connecting of the adjoining tiers of the form assemblies FA which will be described later. These holes 36c have other uses as will be described later.

Sliding valve arrangement VA can be used in assembly FA1 for inserting concrete and vibrators through the forms; valve is shown and described with Fig. 43.

When very thin panels are to be cast, with a relatively large groove form 37 such as that shown in Fig. 21, additional light reinforcing (not shown) should be used to reinforce the thin edges adjacent to the groove, to prevent breakage. Such reinforcing may be corrugated wire fastened to wires 39 and bent to clear form 37.

Figure 17 shows assembly FA1 in full lines, and an identical assembly FA2 directly above it, indicated by dot-dash outline. These assemblies are bolted or pinned together by means of bolts or pins through holes 36c. This tier arrangement can be used to cast a thick panel section, such as one having a double thickness. If desirable, the top part or half could be a different type mix, poured at a later time. A third tier, assembly FA could be added to make a triple thickness panel. It would have reinforcing grids only in the two outer assemblies, the center assembly acting as a filler. A triple thick panel can be made with three pourings of various type mixes. In reinforcing for a double or multiple thick panel section, the two or more grid reinforcings should be tied together with vertical wire ties, as shown in Fig. 17. A single panel may be cast, then a layer of insulation material may be placed over it. A second layer of concrete may be poured over the insulation, thus making a laminated panel. This type panel may have two reinforcing grids, one in each concrete layer, tied together with tie wires. Various types of insulation could thus be sandwiched between two layers of concrete. A metal sheet or other suitable gamma ray barrier could be placed between layers of concrete. A layer of asphalt or tar, forming a vapor or moisture barrier, could be spread to insulate against moisture penetration. Vermiculite, aerated-glass, kraft paper, aluminum and other thermal, sound, and moisture insulators may be placed over the asphalt or tar. Then the top layer of concrete is poured. Insulating boards may be placed over the asphalt or tar with a second coat of asphalt or tar on top to protect the board from chemical action of the damp concrete. Precast sections may have threaded inserts placed flush on the face of a section. When a heavy load is likely to be held by inserts, such inserts should be connected to the reinforcing. Inserts may be held by templates that span the form assembly. These inserts may be required for connecting to adjacent structural members or utility fixtures.

As a modification, forms 36 may be formed with a wider web which would allow two or more lines of slots for reinforcing. This would be more desirable than two or more sections stacked together to form a double or multiple thick section. In concrete block reinforcing shown in Fig. 57, two sections 36 are shown tied together for double reinforcing. If double reinforcing is going to be a standard practice, this multiple thickness form with two lines of slotted holes would be used.

The half rounds 37c, shown in Figs. 18, 20, and 21, mold a half-hole in precast panel section 24. Half-holes in adjoining concrete panels form an opening at the joint for access in entering reinforcing pin-like member 47 and grout 48 when erected in the field. Half rounds 37c can be omitted on one side of the form, if only one hole is wanted in the joint. After one panel section 24 is partially cured in assembly FA1, a second tier of reinforcing and forms FA2 can be superimposed or stacked above it. Pins, or bolts, inserted into holes 36c, hold assemblies in alignment. A non-adhesive sheet or coating, such as a resilient rubber or plastic sheet or an oiled sheet of paper, is placed on top of the lower cured, or partially cured, concrete panel. The second (or upper) concrete panel section is then cast in assembly FA2.

Additional panels may be cast above it, using the same method, that is, using the adjacent lower panel and its form assembly as a base, guide, support and to keep the upper assembly in alignment. This method of stacking forms in tiers and casting would leave less chance of errors in making duplicate pieces. This method would require less space for casting and curing, and it would allow the forms to be set up quickly. Tapered panels (not shown) may be cast by using tapered forms, or by using tapered plates between assemblies FA. Tapered plates (not shown) placed on top of forms 36 would serve to guide a scraper in tapering fresh concrete in an assembly FA1.

Surface mat 45, shown in Fig. 17, may be a steel plate or other suitable casting surface. Suitable patterns placed on mat 45 may be used to mold ornamental designs or lettering in the panels being cast. Assembly FA1 could be tack welded or bolted to mat 45 for maintaining alignment and for stiffness.

Figure 24 shows a double looped, reinforcing anchor, or connector part 39a. It, or a similar single looped wire, can be used as an anchorage in a footer, connecting it with these precast panel sections. When it is desirable to have anchored curved walls to bow sideways slightly to allow for expansion and contraction, cored holes left by fillers 40 around anchors 39a or adjoining end of reinforcing 39 can be filled with non-hardening mastic to allow wires to bend slightly. Anchors 39a also can be cast in panel sections where continuous reinforcing is not used. These anchors 39a, and similar single looped anchors, can be used as connectors and reinforcing at the splices. Wire fabric reinforcing can be used to replace reinforcing 39. Such wire fabric would lap over the anchors 39a to maintain continuity in reinforcing or be welded to them. Reinforcing grid of wire 39 could have intermediate reinforcing wires connected where it crosses other wire, but it would not be connected to the forms. It could be wire fabric, or all such reinforcing could be combined into one prefabricated grid with four inch mesh, with only alternate strands connected to the forms.

The center part of the double loop on reinforcing 39 and 39a is longer than the pin diameter to allow the single looped end of a wire 39 to enter, and to allow space for reinforcing wire 46. Wire 46 is placed in the field or place of erection, as shown in Fig. 25. Double loops can be made to hold a larger wire 46 than that used for other reinforcing. As stated before, the center part of the double loop that passes through the crotch would be welded, otherwise it would stretch out of shape under certain conditions unless otherwise restrained. For instance, when a double loop is held by pin 41 to the form 36, the loop must be welded or have fillers equal to the size of wire 46 and 39, as can be seen in Fig. 25. Wire 46 and the single loop on adjoining wire 39 requires the centerpart of the double loop to be elongated. When wire 46 is not used, the loop can be smaller. This double loop on wire 39 is a form of hitch. It is simple and strong. Other types of knots or hitches could be used, especially if welding equipment is not available for welding this part.

Figure 25 is a fragmentary section through a typical field splice of a concrete building shell, such as a wall. Precast panels 24c and 24d are the same as or similar to panels 24. Pin-like member 47 connects the looped ends of reinforcing 39. They can be welded together also. Opposite edges of the panels have different type reinforcing ends, single loop on one edge and double loop on the opposite edge. The permanent pin 47 is inserted through a rounded gap which is created by the half round pieces 37c on the forms. When the standard joint is large and pin 47 is small with a narrow head, it could be inserted through the joint gap, thus omitting the coring of a hole with pieces 37c. Pins 47 are, in general, tapered. This is desirable in highly stressed work for, by joining it tightly, the reinforcing at this splice is prestressed. Pin 47 can be made of a piece of wire including an end of the reinforcing. When desirable, pins 47 are threaded and used with nuts to hold the adjoining edges of these sections together. In addition, they could hold laminated sections, interlocking walls and other structural or utility members together. Threaded pins 47 may have long sleeve nuts for connecting to adjoining members. Pin-like member 47 should be held securely in the reinforcing loops so it cannot fall out before grout 48 is inserted into the joint. The pin end may be burred, after it is inserted, to prevent it from sliding out of the loops. Pin 47 could have a split end, similar to the end of a cotter pin which could have prongs bowed with ends touching so as to allow them to straighten when being driven through looped reinforcing and then bow out again to hold the pin securely. Also, the pin end could be split like a cotter pin which would be bent after insertion, thus securing it in place. The grout 48 is inserted, during the erection of panels or later, to key and bond the panels together. The cured grout 48 prevents pin 47 from moving out of place.

During bad weather, the panel sections may be erected and joined together with the reinforcing. Since light reinforcing cannot take compression, removable wedges (not shown) may be driven in the joints to help hold the sections in alignment until after grout 48 is placed and hardened. Then the wedges are removed and the wedge holes grouted up. As can be seen in Figs. 25 and 26, the edge groove, which is molded by the form sections 37, allows the adjoining panel sections to be keyed with grout 48. Grout 48 would be a stiff, strong concrete mix. When it is inserted, it should be vibrated to eliminate pockets. Grout 48 may be entered in the round openings located in the joint where the pins are inserted. The hopper or hopper hose, which carries the grout, may have a nozzle placed at the round openings to force the grout into the joint. Vibrators may be inserted in the openings, if a means for vibrating the grout moving through the hose is not used.

Pockets, left in the edge of the panel sections by the removal of fillers 40 should be pre-grouted level with the edge groove when they are likely to fill with rain water. Rain water in pockets after erection would dilute the grout 48 and weaken it. Rain water in pockets would freeze and crack panels in cold weather. Pockets left by fillers 40 that are to be overhead, that is on the underside of a vertical panel, would be pre-grouted before erection to prevent air pockets from forming when joints are grouted solid.

Since reinforcing 39 has little strength other than in tension and shear, it would probably be necessary to hold the adjoining panel section in alignment to prevent side movement, until after the grout 48 has hardened. An arrangement is shown in Fig. 26 which would keep the concrete panels in alignment. It will also prevent the fresh grout 48 from seeping out of the joint.

In Fig. 26, a bolt 49 passes through the holes in bars 49a and 49b. When the nut on bolt 49 is tightened, the bars are brought to bear against panel sections 24c and 24d. After grout 48 has hardened, bolt 49 and bars 49a and 49b are removed and the bolt hole is filled with grout. When conditions are such that only alignment of panels is to be performed, these bars 49a and 49b could be short and spaced intermittently. When bars are used also to seal joints to prevent leakage of grout 48, bars 49a and 49b are spaced to give a continuous seal. The grout 48 seals the reinforcing in joints against the elements which cause corrosion.

Figure 27 shows a modification of the forms. It is a strong edge from section 50 which molds precast panel section edges with a standard groove. This form section 50 combines the principles of forms 36 and 37. It has suitable holes for fillers and reinforcing. It has the advantage of being in one piece, instead of two. It requires less material. Form 50 is harder to strip from concrete than forms 36 and 37, since the latter can be taken apart to facilitate stripping, especially if form 37 is resilient. Pin 41 would bridge the groove in form 50.

These methods described, of casting with assemblies FA1, etc., can be used, with suitable shaped form members, to cast not only flat but curved (including those with spherical curvature), tapered, and irregular shaped precast sections. Radial bowed form or curved form sections may be used with the same setup. Combinations of straight and curved sections could be used in the same assembly for, in general, all form sections are interchangeable, with slight modifications when necessary being made by cutting and welding. Modifications, using pieces of standard form sections can be used to mold window openings, etc., in precast panels. Sponge rubber with a resilient rubber sheet covering can be inserted within an assembly to core rough holes for piping, etc.

In Figs. 28, 29, 30, and 31, a modification of the reinforcing and forms previously described is shown. This modification is, in general, suitable for heavier reinforcing. The edge form section 36d is similar to form 36; and form 37d is similar to groove form 37. Reinforcing wire or rod 39b is similar to reinforcing 39. The pin 41a is similar to pin 41. The resilient filler 40a is similar to filler 40. Thick reinforcing rods and wire are costly to fabricate with looped ends because of their weight and size, which would require costly equipment for fabricating them. So heavy reinforcing is economically connected by a clevis and pin arrangement in this modification. Reinforcing is stretched to prestress it by a similar method to that described for the wire reinforcing 39. Heavy bowed forms cannot easily be pulled into alignment as would light forms 36 in assembly FA1. In this modification reinforcing 39b is threaded at both ends. Since threading would materially cut the effective area of the cross section of reinforcing 39b, for economical construction the ends of reinforcing 39b could be upset to thicken it for threading, or heavier threaded studs could be welded to the ends. A threaded clevis 51 engages one end of reinforcing 39 and a pin plate (not shown) which is a single pronged member similar to clevis 51, engages the other end. Clevis 51 and the pin plate are threaded onto reinforcing 39b and accurately set either before or during its assembly to the forms.

The modification shown in Figs. 28, 29, 30, and 31, can be used as follows: Clevis 51 fits into the rectangular opening in the resilient filler 40a. The outside of filler 40a is round and fills a sunken round hole portion 36e. The temporary pin 41a, which has identical ends, is inserted into filler 40a and clevis 51. A hole in the flange of edge form 36d allows access for pin 41a. When the form is pressed down at this hole, it molds a half-hole in the panel, as would member 37c. This sunken depth of hole 36e would be as deep as required to make a suitable gap or joint at the splice between panel sections. If the hole is not sunk the splice gap would be equal to twice the thickness of the forms plus the diameter of the pin 41a. This would be too large for economical construction, in general. The sinking of hole 36e can reduce the joint gap down to zero, if necessary. The required gap would be predetermined before the forms 36d are designed. Although clevis 51 and pin plates can be attached and set accurately to reinforcing 39b before assembly to the forms, it would probably be more economical to assemble them so they engage slightly, then clevis 51 and pin plate are used as a means to pull the forms into alignment while they are being further threaded onto reinforcing 39b. When this threading action is to be used for pulling the forms into alignment, pins 41a are inserted. Pins or clevis 51 and pin plate is gripped and turned to tighten the reinforcing 39b. Special tools would probably be used to grip the ends of the pins and turn them. When the desired adjustment of reinforcing length has been made, the pin or clevis is turned back or forward to a position that lines up pin 41a with the hole in the flange so it can be removed later. Clevis 51 acts similar to the double-looped end of wire reinforcing. The pin plate that fits into the clevis acts similar to a single loop on wire reinforcing. When such parts are located on adjoining panel sections and therefore act the same as do looped wires and pins, their prongs, which interlock, must be parallel to engage one another. When reinforcing 39b has been adjusted, the end of pin 41a is tapped with a tool. This forces the pin down until it enters pin well 52 which is fastened to form 36d. This U shaped pin well 52 is tapered to help form a partly tapered hole, which can engage a tapered end of pin 41a. Thus, the pin 41a is fixed so that the clevis is kept in its proper position. The clevis cannot rotate, nor can it move in or out in relation to the form section 36d. If the reinforcing were a heavy type capable of compression, the pin locking arrangement would help to keep reinforcing inaccuracies from bulging the forms in or out. The pin 41a may have small holes or grooves cut near the ends, which can be gripped to pull the pin out when the forms are being stripped. These forms 36d have holes in the flanges for stacking assemblies in tiers and other connections. These holes are similar to holes 36c.

In another modification (not shown), clevis parts and reinforcing could have right and left hand threads to allow reinforcing to be turned for adjusting. This modification could be used with forms 36d and 37d or with modified forms such as those similar to forms 36d and 37d, but having slotted holes to suit clevis parts. Fillers could be eliminated, or they could be in the form of modified fills shaped to suit slots.

In another modification, clevis parts may be welded to the reinforcing. Figure 32 shows such a modification of the reinforcing. The reinforcing 39c has clevis 39d welded to one end. The other end has a pin plate 39e welded to it. It can be used with light or heavy reinforcing. This type of modification can be used with the forms shown in Fig. 19, the modified forms shown in Fig. 28, or similar modified forms. A modification of reinforcing 39b (not shown) may have the connector part on one end welded, and the other end connector threaded for adjustment.

A modification of forms 36d, 37d, etc., may be similar to form 50, shown in Fig. 27. This modification would have holes to suit the modified reinforcing.

Figure 33 shows a modification. It is a reinforcing anchorage for use along a flat edge of a panel. The reinforcing 39b has a nut 54 welded to the end. It engages a temporary clevis 54a. The clevis is similar to clevis 51, except that it has a threaded shank to engage nut 54. This clevis is used to hold reinforcing 39b during casting, after which it is removed. The hole, left in the edge of the panel by the resilient filler and the clevis, can be grouted smooth, covering nut 54. Nut 54 could be left exposed so it could be used to attach bolts for any adjoining building members, such as door frame stops.

In general, all these form sections are standardized and are inexpensive to make and use. They are quickly assembled and dismantled. They take very little material. They are light-weight and do not require the efforts of a husky workman to set them up. Unskilled laborers can assemble them and there is little chance of error in assembly.

Some of the form sections, especially forms 36, have uses other than that of casting these precast sections. Forms 36 may be a standard construction device with at least four different uses. It could be used as an edge form section for casting concrete panels; a section used, with or without groove form 37, as a template for locating and supporting anchors in footers and other structural members; and for holding reinforcing in block construction, such as concrete blocks. They could also be used as end forms in regular reinforced concrete construction. The sides of the conventional forms could be bolted to the flanges of these edge forms. Edge forms also could hold the reinforcing.

Figure 34 shows a straight, trough-like corrugated precast panel section 1d, which is similar to panel 1 in Figs. 1 and 2. Panel 1d is curved in width, similar in shape to a crescent; the length is straight. Figure 38 shows a typical enlarged cross section through the curved panel sections shown in Figs. 34, 35, 36, and 37.

Figure 35 shows a dished or curved, trough-like, corrugated precast panel section 2d, which is similar to panel 2 in Figs. 1 and 2.

Figure 36 shows a precast, dished, corrugated panel 3b, which is similar to panel 3 in Fig. 1. It is tapered in width; it has the same end cross section as panels 1d and 2d. It is a curved, trough-like panel; a modification of panel 2d.

Figure 37 shows a precast, dished, corrugated panel section 2f, which has a tapered thickness. It is similar to form 2d and is tapered in the same manner as are panels 4. Panel 2f has the typical cross section shown in Fig. 38.

Figure 38 is a common sectional view through precast panels 1d, 2d, 3b, and 2f. It shows the standardization of the curved width construction. The panels have concrete 55, reinforcing wire 56 is across the width, and longitudinal reinforcing wire is 57. Chairs or inserts 58 are supports for this reinforcing. Figure 38 shows the vertical, parallel edges along the sides of the panel. The curved shape of the width of these panel sections, in addition to creating a strong section with a desirable section modulus, has many desirable features. It has a great advantage in that the curvatures of the surfaces in cross-section are identical, having equal radii but different centers spaced vertically. The lengthwise side edge radii, on dished section 2d (see Fig. 35), or sections curved only in length (not shown), would be identical for all panels of a given radial arch. Not only the inside and outside radius of the cross section are identical, but the center line of the reinforcing. Curvature is described as arcs, but it could be irregular. This identical curvature of surfaces provides a constant thickness across a section, parallel to the side edges and the middle ordinate. In other words, there is uniform thickness along spaced, vertical parallel lines as distinguished from uniform radial thickness as would be obtained from a common center. The shape makes the section strong, where strength is required. It allows similar panels to be laminated to it where additional shell section is required for strength or insulation. In addition, it allows low cost casting of these panel sections by stacking as will be described later, and also low cost shipping and storage, since these panel sections are light in weight and they can be nested tightly together to conserve space. When panels are nested tightly together, there is also less chance that poor bearing of the weight from one section to another in shipping and handling will cause breakage. There is no blocking required between panels when stacked, and they would have little tendency to slide or shift apart in transit. A stack of these panels could be lifted as a unit without danger of breakage or shifting while being lifted. These features make the panels particularly suitable for shipping by barge, ships, as well as trucks and railroads. Thus, large economies are made in using this particular design. The curved width shaped section is particularly well suited for arch roof and/or floor construction, such as shown in Figs. 1, 2, 3, 8, and 9, because the area of concrete and reinforcing is so distributed that it will effectively resist bending caused by unequal loads on the roof arch or a concentrated load on the flat center part of the width of the panel. The width becomes progressively radially thicker towards the center, similar to a crescent, which makes it a strong shape to resist bending and impact.

There is bending in a large roof arch, when an arched member has a small depth, from wind loads, and other possible loads, that are not uniform on the arch. The shape of this curved width panel section can better prevent excessive bending than could an arched panel of the same thickness with a straight width. Deeper, flatter, or other width curved sections could be made to suit possible uses. The reinforcing for these curved width sections could be spaced in accordance with the modular unit, eight inches.

In the example shown, the radius and other dimensions were worked out using eight inch spacing. Curved panels four feet wide are the standard used for the example shown as it is a widely used standard for building panels. Other standard widths could be established. The four feet width is also the chork; the length of the arc was chosen as fifty-six inches. The arc is eight inches more than the chord length, and it is also the sum of seven modular spaces of eight inches. With the arc and chord established, it is found that the radius is roughly thirty inches and the middle ordinate is a little over twelve inches. While I have described the curvatures as radial, they can be made also with irregular curves using the same principles of maintaining a constant vertical thickness. These curved width panels have the same cross sectional area and approximately the same weight as would a flat panel of the same vertical thickness, covering the same four foot surface of a building. Reinforcing 56 across the width of the panels would be constant for all curved width sections of any given standard that is set up. These standard pieces of wire 56, therefore, could be made in large quantities with a single set-up at a low cost.

During fabrication, reinforcing 56 may have chairs 58 properly spaced and fastened to it. Wire 56 has a single loop on one end and a double loop on the other end, forming a clevis-like arrangement similar to the reinforcing 39, used in assembly FA1 and shown in Fig. 16. The longitudinal reinforcing 57 on panels 1d would be alike in general. On dished panel sections 2d, they would vary in length, due to the various radii which step up from the side edges to the peak of curved width. The various strands of reinforcing 57 could be of different thicknesses, to take the various stresses to which they would be subjected.

Reinforcings 56 and 57 are connected together, either with chair 58, or they can be fastened together independently with wire clips or weld.

Figure 39 shows an adjustable form assembly CA with reinforcing attached. Assembly CA as shown is used for casting a panel section, such as panel 2d, shown in Fig. 35, in various lengths. End forms are moved inwardly to keep a short panel to be cast centered in the form assembly CA. The principal side edge form section 59 is shown in Fig. 40. The principal end edge form section 60 is shown in Fig. 41. Forms 59 and 60 are curved as shown in Figs. 40 and 41; the back of form 60 is flat the same as is form 59. Groove forms 37e and 37f are similar to form 37. They are curved in the same manner as forms 59 and 60. They are shown in detail on Figs. 43 and 44. The curved side forms 59 and curved groove forms, would be replaced by straight forms 36 and 37, when casting a panel 1d. Longitudinal reinforcing strands 57 for panel 1d would all be the same length, a multiple of eight inches. Thus all reinforcing for panel 1d is similar to reinforcing 39 in Fig. 16. Therefore wire fabric with eight inch mesh both ways, with ends of strands suitably looped could be used, in place of reinforcing 56 and 57.

Assembly CA is shown with identical end forms 60 and identical side forms 59. Modified precast shapes can be made by using side or end pieces with different curvature, flatness, and length. The end forms 60 may be varied, thus varying the depth of the corrugated shell to enable it to take the required loads. Corrugation may taper, from flat at the peak of a roof to a suitable corrugated depth at the ground. Side forms 59 may be varied to step-down the arch span, as would be required for panels 6 and 7, shown in Fig. 1. The assembly arrangement for casting panels 6 and 7 would require skewing of side pieces and other minor changes. Corner connection plate 62 may be tack welded, or have slotted hole connections to allow skewing. The assembly for casting panels 3 would have the same side forms 59 which would be toed-in. It would also have one end form 60 identical to those used for casting panel 2. A short modified end piece would be used on the narrow end.

Edge forms 59 and 60 cannot be economically rolled from a single channel section to the curved shape with ordinary fabricating rolls. A means of fabricating such forms is shown in Fig. 42. An angle or bent plate section 61b could be rolled with the correct radius to the back of angle leg, which would be used as a flange. Then the other leg of the angle could be trimmed to the identical radius or curvature as the back of the angle. The other flange 61a may be made from a flat bar, rolled to the identical radius or curvature, and welded to angle 61b.

For curved construction, the groove forms 37e and 37f would likely be made of a resilient substance to insure ease in bending and stripping. But it could be made of other types of materials, as was described previously for form 37. In place of the tapered trough shape which is shown, groove forms 37e and 37f could be of various suitable shapes, such as a half-round. Half of a rubber tube could be used, for instance. It would be inexpensive and it would have many advantages, such as easy stripping, easy bending, easy cutting, and durability. It would not be damaged in stripping, as would stiffer materials.

Figure 43 shows a plan view of a corner connection of an assembly CA. It is similar to the arrangement shown in Fig. 18. A plate 62 is welded to bent plate 36g. Bent plate 36g is similar to plate 36a in Fig. 18; it is narrower to suit width of form 59. This plate 36g is connected to form 59, with bolt 36. With minor changes, side forms 59 can be skewed to cast panels such as panels 3, 6 and 7. Many modifications are possible to fasten form parts. They could be tack welded together, eliminating connecting clips, which is a low cost method of fastening. Using a burning torch to cut the metal forms used in various set-ups and welding equipment, and to tack weld assemblies or reweld sections together after they were cut for modifications is an economical method of fabricating and dismantling all the forms.

In Fig. 43 is shown typical corner details and a valve arrangement VA to control the flow of concrete. Concrete is poured or forced into these edge form assemblies CA, when the top and bottom spaces adjacent to these assemblies are covered with the cured precast panels and their form assemblies that act as patterns for forming the sides of the panel being cast. A valve also allows the insertion of a vibrator for packing the concrete. A threaded tube 63 is welded to form 60. It has a slot for a sliding plate 63a. Tube 63b is fastened to form 37f so that the holes in tube 63 and tube 63b line up. There are also holes in form 37f, sliding plate 63a, and form 60 making a straight line opening from outside for inserting the concrete or vibrator. The sliding plate 63a has a hole in one end which, when in register with the holes in tube 63 and tube 63b, allows the concrete or vibrator to pass through this edge forming. A nozzle of a hose (not shown) is connected to this threaded tube 63, and the concrete passes through the form under pressure. After the concrete has been inserted, this sliding plate 63a is slid over to block the passage, preventing the concrete from backing out. Strong, dense concrete has a minimum amount of water. As it is more in a plastic than liquid state, it can be forced or poured through a tube. This stiff concrete would not have too much of a tendency to squeeze through minor cracks. There would be a suitable number of such valves VA spaced in the edging forms.

Valves VA are also used (not shown) in straight form assemblies FA1, for casting flat sections if a casting method similar to that for dished sections is used, that is pouring a panel with a cured panel above and below it.

By comparing Figs. 43 and 22, it is evident that much of the construction is typical.

Figure 44 shows the similarity of the edge forming to that in Fig. 21. The thin lower side edge of curved panel would be relatively weak in its resistance to breakage from rough handling, so the ends of wire 56 could be made long to allow them to be corrugated and placed parallel and close to the forms 59 and 37e to reinforce this part of the panel, or additional reinforcing could be placed there, also in the upper thin edge, as was described for panel 24.

A cross section of edge form 59 is similar to form 36 in Fig. 21. The depth of form 59 varies radially, but is constant vertically. The radial end depth of form 59 is the same as the vertical depth of form 60 and the depth of straight forms 36 which are used for straight curved width sections. Form sections 59a and 59b which are identical to form 59, are connected to form 59 with pins or bolts. Forms 59a and 59b are on adjacent form assemblies CA which have cured panels attached and are used to help form the new panel.

The manner in which edge forms are nested, in casting one panel on top of another, by using adjacent panel section to help form new sections, is illustrated in Figs. 44 and 48, and described fully further on.

Since the vertical depth of forms 60 is made to suit the end radial depth of forms 59, and forms 59 increase in depth radially towards the center, shims or resilient fillers (not shown) are inserted between stacked forms 60 when short panels are cast with assemblies CA.

Figure 45 is a fragmentary sectional view through a precast dished panel section, showing the use of chair or insert 58 for holding reinforcing. Without a chair 58, it would be necessary to have some other means to hold the reinforcing properly, such as conventional wire chairs, non-corrosive concrete chairs, or resilient rubber or plastic chairs. Reinforcing could be welded to conventional wire chairs, or otherwise fastened.

Figures 46 and 47 are sectional views taken through Fig. 45.

Chair 58 is made of wire and has a broad base to prevent it from tilting. The chair or insert 58 can be used for other than a means to support the reinforcing, and it is so described further on. A chair 58 supports the reinforcing and bears against the adjacent cured panel section which is to mold the concave surface of the panel to be cast. Thus, chairs 58 maintain the proper position of reinforcing. It also helps to prestress the reinforcing. The lower coiled part of chair 58 forms a thread for a round, slotted nut 58a, which has a countersunk, tapped hole through the center and is threaded outside to fit chair 58. A countersunk head bolt 58b engages the tapped hole in the center of nut 58a; the outside threaded part of nut 58a engages the coil of chair 58 that forms a thread. A washer 58c is used to keep nut 58a and chair 58 from the surface of the panel where they would otherwise be exposed to destructive elements after the concrete is in use. Washer 58c can be omitted in modifications, as will be seen. The countersunk hole in nut 58a can take the head of bolt 58b when washer 58c is not used. When these chairs 58 are made of spring steel, as shown in Figs. 45, 46, and 47, the spring action of chair 58 can keep the reinforcing wires 56 and 57 taut, and thus maintain a stress in the reinforcing, which is highly desirable. When soft non-resilient wire is used, a tight coil is made (not shown). After the concrete is cured, chair parts 58a, 58b, and 58c can either be removed or left in the panel, depending upon further possible uses to be made of the chairs. After the panels are cured and chair parts 58a, 58b, and 58c are removed, the lower end of the chair 58 may be gripped with pliers, and the lower part of the coil may be pulled out and clipped off, then the cavity may be filled with grout. Then the chair holes may be filled with grout if they are not to be used for other purposes. Threaded parts from other structural members may be inserted into the thread-like coil of chair 58 or to the thread in the center of nut 58a if it is left in for this purpose. A non-corrosive, ornamental insert may be threaded into either chair 58 or nut 58a.

Washer 58c may be of suitable thickness. Various thicknesses could be substituted to vary the distance from the reinforcing to the panel surface. Washer 58c may be of a resilient material, such as rubber, so that it could form a dovetailed recessed hole, and be removable. This dovetail arrangement would allow better keying of the grounding. The upper part of chair 58 is twisted around reinforcing 56, or it could be welded to the reinforcing. Chairs 58 may be fastened to standard reinforcings 56 in a fabricating shop where facilities would allow this type of work to be done at low cost. Spring steel wire could be coiled and attached tightly to wire 56. This may be done while it is hot, since it cannot be bent sharply when cold. If wire end 58d of chair 58 is annealed in the shop, it could be bent cold in the field. Grid reinforcing and chairs 58 or conventional chairs may be all welded together.

The top loose end of chair 58 is shown with dot-dash outline 58d. After reinforcing 56 and 57 are assembled, end 58d is twisted around wire 57 into position 58e so the reinforcing is joined together by the chair 58. Reinforcing 56 and 57 may be welded together and then to chair 58. The standardization of the chair and supplementary parts allows various combinations of these parts to suit possible conditions. Chair 58 can be used alone, or with supplementary parts. The center of the chair is intentionally offset from wire 56 and 57, so that bolt 58b can pass the reinforcing and a slotted nut 58f can be engaged at the upper end. This nut 58f may have a conical bottom, which would form a countersunk hole to fit the head of a countersunk through bolt. This would be used for connecting structural or utility devices, as will be described later. Bolt 58b could be short enough to engage nut 58a. Under severe conditions, bolt 58b should be long enough to reach above the cross reinforcing 56 and 57 to prevent the spring-like chair from tilting or upsetting. A bolt 58b of the correct length could be used as a gage, particularly for tapered panels and as a stop to maintain a thickness of the panel in casting.

To space the long reinforcing 57 quickly and securely, chairs 58 would be attached in such a manner that their center is always downhill from adjacent wire 57. Thus wire 57 bears against chair 58 before it is fastened to it. See Fig. 38 which shows chairs 58 attached in this manner.

The chairs 58 could be used on other than curved sections. It would maintain the correct position of the reinforcing by preventing sagging, and to core holes for possible future connections, and form inserts for future connections. Barbed wire could be used instead of wire 56 and chairs 58. The barbs on the wire would act as chairs. Old, discarded barbed wire could be used along with used bailing wire. To form threaded inserts for connecting any utility or building member, chairs 58 or inserts similar to chairs 58, could be placed at other than the standard positions for chairs, such as by inverting so as to form an insert on the convex surface. Reinforcing small plates or bars could be used to connect these extra chairs or inserts 58 to the nearest reinforcing 56 or 57. Temporary shallow holes in the bottom forming panel could act as a template. A fillister headed bolt in chair insert would engage these template-like holes.

A method of casting curved panels by stacking form assemblies CA with cured panels incased in them, and to thus use them to mold the surfaces of the panel being cast, is shown in Figs. 48 and 44. The assembly CA, such as CA6 in Fig. 48, is used to cast a panel which is formed between two cured panels in assemblies CA4 and CA5. The strength of the adjacent assemblies CA, and the panels already formed and cured in them, securely hold and align assembly CA6. If these sections were cast without some support such as the adjacent form assemblies they would have a tendency to spread and buckle and twist. With this set-up, once an accurate form assembly or two are made and have castings cured in them, panels cast later using the cured panels in form assemblies, are made accurate automatically with merely a light-weight form due to the strength in the adjoining form assemblies with their cured panels. This method is economical in the use of material for the forms, in fabricating, shipping, handling, and labor in setting up to cast a panel section. All this increases the savings of this constant curvature type of precast construction.

Figure 48 shows a cross section of a carriage 64, precast curved concrete panel sections, and the forms used for casting them. Carriage 64 has a form assembly CA1 attached to it. One of a series of assemblies CA, identical form assemblies CA2, CA3, CA4, CA6, and CA5 are above assembly CA1 in tiers. Identical cured panels are still encased in assemblies CA4 and CA5. Assemblies CA2 and CA3 have been stripped from the two lower cured panels. The thick saddle 64a, with form assembly CA1, is on carriage 64. It is used for forming the bottom surface of the first panel section which has form assembly CA2. A cured panel still incased in form assembly can be substituted for saddle 64a. A precast panel can now be cast with form assembly CA6 and the panels within assemblies CA4 and CA5, which are used to mold the bottom and top surfaces of the panel being cast. If both surfaces of the panels did not have an identical curvature, they could not be molded and cast with this method. This seems to be more or less self-evident in Fig. 48. The fresh concrete can be inserted within the form assembly CA6, before assembly CA5 and panel in it are lowered down to assembly CA6. Or fresh concrete can be forced into the cavity within assembly CA6 through a valve arrangement VA, shown in Fig. 43. All panels, particularly curved panels, which are to be used as top panels in stacking, such as that within assembly CA5, could have a hole or holes cored near center for entering fresh concrete and vibrators.

Assemblies CA are used, similarly to assemblies FA, especially when casting a layer of concrete, topping it with insulation materials, and then pouring thereon a second layer of concrete. Wire ties should be used to tie the reinforcing in the two curved concrete parts together. This would be a more difficult operation for a curved panel in assembly CA than for flat panel in assembly FA. A method for attaching tie wires would be as follows: Tie wires would be fastened by twisting or welding them to reinforcing 56 and 57. A full length chair bolt 58b and slotted nut 58f are used, so that tie wires can be coiled around bolt 58b just below nut 58f. After concrete has cured sufficiently to allow the removal of the top forming panel, nuts 58f are removed and the coiled tie wires are gripped with pliers, pulled out, and straightened, later fastened to grid above. Insulation can then be placed or spread. An assembly CA is placed above and tie wires are attached to the reinforcing 56 and 57 on it. A cured panel, with assembly CA edge forms attached, is placed above. Then concrete is inserted or poured, the same as is done for other sections. Tapered curved width panels, such as panels 2f and 4a, could be made by using tapered forms, or by using tapered filler plates between assemblies CA. Tapered plates, which could act as a guide in tapering the fresh concrete with a scraper, could be used on top of the edge forms. A scraper spans the form assembly and is notched at the ends to lower the scraping edge to the desired position.

When stacking sections for casting and curing, as is shown in Fig. 48, the form side pieces 59 line up, making it possible to use pins or bolts to fasten them. The end forms 60, however, would step as shown in Fig. 49 when they are stacked. An adjustable clamp 65 is made so that its ends engage the bolt holes in the adjacent flanges, holding forms 60 in alignment. An adjustable clamp 65 is used to suit various conditions, because forms 60 are a standard used for forming ends of a panel that is straight in length, or for the ends of a curved in length or dished panel. Since the long radius of dished panels can be of different standards, this clamp 65 would make it possible to vary the stepping, as shown in Fig. 49. When the longitudinal radius is changed, these clamps 65 would be adjusted to suit the stepping that would result. Modified forms 60 may have a large flange at the bottom and a small flange at the top to allow the bolt holes to be spaced to line up for such an arrangement. Forms could be tack welded, rather than clamped, together.

Adjustable clamp 65 has an upper, straight, threaded shank with an offset at the end to engage the bolt hole. It has two nuts to hold a bent eyebolt. The eyebolt fits loosely until the nuts are adjusted and tightened. An offset at the end of the eyebolt engages the other flange hole.

Figure 50 shows a stacking and casting method which has a hole coring feature in addition to the method already shown in Fig. 48. A method is shown for coring or casting holes in a curved panel section 1ca. Thus these panel sections could be bolted together to make laminated shells suitable for combining panels of various qualities, such as strength, insulation, and waterproofing. Pins 66 are inserted in holes which are properly spaced in panel 1cb of a cured panel section. All pin holes are parallel to each other and perpendicular to the surface at the center of a panel. The end of pin 66 should have a hole drilled in the end of its shank to receive a resilient tip. These resilient tips would bear against the top of the bottom panel section 1c, coring the hole completely.

Figure 51 is a section through a typical side splice of these curved width panels. The panel sides form a valley. See Fig. 4 which shows a typical sectional view through this type of splice. Adjoining panels 2 have their reinforcing 56 connected with pin 47. Grout 48 seals and keys the adjoining sections together. Reinforcing 46a is held by the double looped, clevis end of wire 56. Short cross wires (not shown) fastened to tension wire reinforcings 46a, are hooked at the ends for anchorage. They reach into grooves on panels 2. These cross wires on 46a prevent large undesirable cracks from forming in grout 48. Reinforcing 46b and 46c could be fastened to the cross wires on reinforcing 46a. When desirable a corrugated wire (not shown) could be used in place of short wires on reinforcing 46a.

Tension reinforcing 46b and 46c are used to distribute reinforcing to suit loading conditions. The splices shown in Fig. 4 and Fig. 51 are similar to the splice shown for straight sections in Figs. 25 and 26.

The panel sections shown in Fig. 51, indicated by concrete 55, include panels shaped as shown in Figs. 34 to 38 inclusive. To align and bring the panel sections into proper relationship, there is an arrangement similar to that shown in Fig. 26. A bolt 49c is similar to bolt 49; angles 49d and 49e function in a similar manner to bars 49a and 49b.

The reinforcing can be connected with pins 47, and temporary wedges can be inserted between the panels to keep them spread. Then by tightening this bolt 49c, these two panel sections are brought into their proper position. These angles 49d and 49e could be either short or long pieces. In addition to being used to align the panels, they could be used to prevent fresh grout 48 from leaking out of the joints. After the grout 48 has hardened, these bolts 49c, along with angles 49d and 49e, are removed and the holes filled with grout.

Figure 52 shows a fragmentary sectional view through a building shell constructed of curved width panels 2. A segmental strut 5 spans the width of the panel. Cross struts 5 are also shown in the ridges of the buildings shown in Figs. 1 and 8. Strut 5 stiffens the curved panel to carry stress across the chord line and to prevent the chord width of the panel from spreading or contracting. They are omitted when loads are light and panels are able to take all possible loads.

Strut 5 has strands of reinforcing wire 5a, which are welded together, or fastened by other means. Reinforcing is looped to engage bolts which are threaded into sleeve nuts on pins 5b, which are used in the valley splice of panel sections 2 in place of pins 47. Bolt 5c is inserted from outside the shell through a cored hole formed by chair bolt 58b and nut 58f. A threaded insert 5d, which is welded to reinforcing 5a, is cast into the rib to receive bolt 5c. A bolt 5e is shaped so that it can bend when expansion and contraction causes curved panel 2 to bend in width. Bolt 5e has a round head which is held by a washer 5f. Washer 5f is welded to reinforcing 5a. The rounded bolt head on bolt 5e allows this bolt to turn when the erector is gripping the bent shank with a wrench and turning it. Bolt 5e is threaded into a chair-insert 58. Since panel 2 expands and contracts and thus rises and falls due to shrinkage when curing and thermal changes, a resilient capping or filler 5g is placed between strut 5 and panel 2. This capping 5g may be a mastic or a concrete mixture that contains a large amount of vermiculite which is resilient. Capping 5g can be cast onto strut 5 before erection, or it could be placed in the gap after strut 5 is erected. The gap allowed for turning bolt 5e could be filled also. Resilient substances other than vermiculite may be used. If the gap is not objectionable, capping 5g can be omitted. These segment struts 5 can act as fillers where desirable, such as window sills and headers in vertical walls, and as a straight edge for matching to the tops of partitions. They can be used as shelves for a vertical corrugated wall.

Modified precast segmental shaped sections that are similar to sections 5 and 67, but with suitable reinforcing connections, may be used to fill in the segmental floor areas between sections 24 and the corrugated walls.

Figure 53 is an arrangement showing a fragmentary view through a building shell made of curved width panels. Fragments are shown of corrugated panels, large struts 67, and rib 22a. Struts 5 may be used instead of struts 67 when the loads are small. Struts 67 and/or struts 5 and rib 22a would be required where exceptionally heavy loads are to be carried, such as those from hurricane winds, or when long spans require additional strength to that which precast panels can carry. When corrugated panels are used with ribs 22a, they would form an economical multiple arch construction. The depth of rib 22a may be varied to suit possible loading. Rib 22a may be straight or curved. The reinforcing in rib 22a should have a truss-like arrangement when loads require it. A nut is welded to the vertical reinforcing in rib 22a. A threaded pin, which ties the edges of two curved shells together, projects down and engages this nut. Typical splice reinforcing 46a is used for this construction.

Strut 67 has looped reinforcing connections at the ends to fasten them to eyebolt reinforcing in ribs 22a. The loops on strut 67 are shown as a welded type; they may be twisted the same as loops on wire 39. For utility wiring, a conduit 67a could be cast in these struts 67 in such a manner that they line up with the similar cast conduit in rib 22a. This could be done with tapered cores, which could be driven out after casting. Conduit, such as 67a, could be suitably placed in the walls above the floor for easy access.

Figure 54 is a sectional plan view through a folding wall or partition. Such folding walls could be the means used to make multiple-purpose or convertible rooms, and thus it would be a means to more effectively use a smaller house or other buildings at a great savings. In modified arrangements (not shown), these folding sections 35a could be mounted horizontally and be moved in a vertical plane to act as an overhead door or partition. The diagonal joints between sections when suitably arranged would shed water.

Serpentine or corrugated precast reinforced panel sections 35a are similar to panel sections 35 shown in Fig. 15A. Because of the curved shape of panel 35a, it is much stronger than a flat panel. It is light in weight, particularly so when it has considerable amount of vermiculite as an aggregate. Panels could be laminated with the methods previously described for other panels. A folding partition made with these panels 35a, would be highly desirable as it would be light in weight and would have durability, strength, fire safeness, thermal, light, and sound insulation. It would be a barrier against moisture, fumes, dirt, insects, rodents, and other undesirable possible intruders, or elements. It is neat in appearance and low in cost. These sections 35a, when not in use, fold and nest together in a small space. They are shown folded by the dot-dash outline in Fig. 54.

Figure 55 is an enlarged sectional elevation through such a folding wall. A resilient seal 35b along the top and bottom prevents the passage of sound, heat, dirt, moisture, air, fumes, and light. Hinges 35c are offset, to allow these sections 35a to close and nest tightly. Bottom hinge 35c has its pin threaded above the hinge to engage a self-locking nut which is between the head and the top of the hinge. This hinge pin has a slotted head, which can be turned with a screw driver while the nut is held to keep it from turning. This action lowers the hinge pin and inserts it into a threaded floor insert. Thus this hinge pin connection with the floor insert fixes the bottom of these folding wall sections, preventing swaying or other movement when so desired. A swivel caster with resilient tires may be mounted on this hinge pin to take all or part of the load of these folding sections 35a to the floor, rather than to have the ceiling carry the weight. The track 68 used for guiding these folding sections 35a is fastened to the ceiling with a few bolts. If in a modification, ceiling and top of track are flush, track 68 could be quickly taken down and moved to different ceiling locations or stored when not in use. Folding panels 35a have a swiveled hanger-guide 69 connected to the third hinge from the left (see Fig. 54). If a partition has more than three panel sections 35a, every other hinge 35c will have a hanger-guide 69, to allow the partition to be folded. This hanger-guide 69 can transmit all the load of the partition to the track 68, if casters on the bottom of the door are omitted. In modifications, hanger-guide 69 and track 68 can be omitted, with castors on the bottom hinge 35c supporting all of the partition. A hinge pin can be inserted into the ceiling insert, similar to the method described for the bottom hinge pin. The end panel 35a on the right (see Fig. 54) can be used as a door in the partition.

Figure 56 is an enlarged fragmentary sectional plan view through the adjoining edges of adjacent folding panels 35a. A vertical seal 70, in the joint between panels, may be of resilient rubber or plastic for the best results. Under some conditions, a felt seal, or anything that would stop heat, sound, light, air, and dirt, would be useful. The joint could be made without a seal, but a small seal would add materially to the usefulness of the partition. The groove in one vertical edge of section 35a would have a concrete filling which would project out to partially fit into the adjacent edge of adjoining section 35a. Or a resilient tube member may be used to key the two grooved edges together and the concrete filler would be omitted. Such a resilient tube would be attached to one of the panel edges. The seal 70, shown in Fig. 56, could be fastened to the section 35a on the right. The center, bulging part of seal 70 should be unattached, to allow it to expand and contract to fit tightly into the groove of the section on the left. Seal 70 has a round bulb along the edge between hinges, etc., as shown in Fig. 55, to offer a seal for any open or folded position of the sections, so partition may be used for other than straight closures. The ends of the partition at walls would have similar seal arrangements to those between sections 35a. Other seal modifications could be made to suit other conditions, such as a half-round bulb (not shown) in place of the round bulb, to make a tight seal between sections 35a when partition is fully closed or folded within slightly less than ninety degrees of closed position. The half-round bulb would make a flush surface for the fully closed sections, except for the hinges. Sections 35a are grooved on edges that have hinge connections to allow for the bulb on seal and hinge.

Modified folding partitions may be made with sections similar to 1c and arranged as a single shell similar to a single shell of the arrangement shown in Fig. 15. Castors may be attached at the hinges and the centers of sections to make them self-supporting.

Modified temporary construction may be made with these precast sections, such as the crescent shaped panels 1c. They could be set-up as temporary partitions and barricades with probably a resilient seal instead of grout, or a relatively weak grout at the joints. The resilient seal may be similar to seal 70, shown in Figs. 55 and 56. Pins may be inserted from the protected side. A split bowed end pin (not shown), similar to a cotter pin would be used if one side of barricade was to have a seal maintained.

In general, the precast corrugated sections would fill the need for building products in many fields of construction. They would be particularly suitable for use as liner members for drainage and irrigation ditches. They could also be used to make matting to prevent scouring action by turbulent water on shorelines, spillways, etc. Low cost mats for roadways and airfields may have a herringbone pattern of corrugated sections, with convex surfaces of sections placed down and the upper segmental furrows may be filled with sand, gravel, etc. This would make a tight soil covering that would drain readily. Similar mats with convex surfaces of sections placed up would be suitable for lining reservoirs, tanks, etc.

Corrugated sections that are curved in length may be used as sections of pipe. The bottom of such pipe would have modified sections to make the bottom flush. These modified sections would be similar to saddle 64a, shown in Fig. 48. These curved corrugated sections could be arched over conveyors and other such equipment. They could be used as liners for tunnels. As tunnel liners, corrugated sections may be used in place of forms and they would remain as part of the concrete structure. The sections would have tie wires projecting from the surface to tie into the poured-in-place concrete.

The form assemblies, particularly the flat form assemblies such as FA1 in Fig. 16, could be used to cast a concrete section with brick, stone, or other types of veneering. The concrete, reinforcing, and veneering are cast together. The stone, brick, or other veenering is laid without mortar, since mortar would be part of the poured concrete. This method of casting panel sections is done in general by using the wire reinforcing to support the veneering. Chairs below the reinforcing are used where necessary to restrain it from sagging. The veneering, such as stone or brick, is laid on the reinforcing, allowing space below for the bulk of the concrete. The stones could be rearranged until a desirable artistic effect is obtained. Then the concrete is inserted into the forms. The concrete may be inserted through the threaded valve connections VA or from above by temporarily removing a veneered part. Vibrators at some of these valve connections VA may be used to keep an even level to the fresh concrete until it is raised to the desired level. Deep raked or flush joints may be made by this method. The irregularities of unfinished stone help to form a gap for joints, allowing concrete mortar to creep up to the proper level. If stones for veneering have straight edges, bits of stone or other wedges may be wedged between them to form a space for the mortar. Bricks may be wedged apart, or the bricks may have raised knobs which form gaps between the bricks to receive mortar. It is necessary to omit some stones or bricks in casting along the edge of the panel. This allows the brick or stone to be set in the field to span splices, and to be neat and attractive. Removable filler blocks are cast in the panel, where stones and bricks are omitted, to core a space for them. These blocks may be tapered for ease in removing. They are removed from the concrete after it has cured slightly.

There are various advantages to this type of construction. Veneered panels may be made in bad weather in a protected working space, indoors or outdoors, in a factory, or on the building site. Under normal circumstances, outdoor masonry work is stopped during bad weather. The stone need not be raised manually to set it in the wall position. Little if any scaffolding is needed. This method may be used to cast reinforced, artistic slabs for patios and floors, if stones, bricks, etc., are used for patterns. This method would securely bond the concrete, reinforcing, and veneering, such as stone or brick. These panel sections may be much thinner than conventional slabs which are later veneered, because they constitute a stronger homogeneous mass. The reinforced stone, brick, or other veneer concrete panels may have vermiculite, or other suitable types of insulation, added to the concrete mix. Suitable waterproofing aggregate may also be included in the concrete mix. Semi-skilled and frail labor could be used in making these veneered panels.

A modified method of making precast concrete panels with veneering such as stone, brick, and tile, is as follows: A resilient mat, such as sponge rubber, forms a casting base. A resilient thin sheet is placed over the sponge rubber. The veneering, such as stone, brick, tile, etc., is placed face down on the resilient sheet. Form assembly, such as FA1, with reinforcing attached, is placed on the resilient sheet around the veneer material. Reinforcing wire is thus above the veneering. Then the concrete is poured and allowed to cure. In this modification, the mortar joints are almost flush. The reinforcing does not have to bear against the veneer material. The resilient sponge rubber pad forces the resilient sheet tight against the veneer surface to prevent the mortar from spreading and covering the veneer facing. The resilient sheet is used to prevent the mortar from entering and clogging the holes in the sponge rubber mat and for ease in stripping. This modification is practical for casting flat or curved panels. A modification, using veneering for both panel surfaces, may use both methods that have been described for placing veneering, or one of the methods described and one of the methods to be described hereinafter, that use terrazo or "Permastone" topping or veneering.

A modification of veneered precast panels may be one having concrete poured into assemblies FA1 or CA1 with or without reinforcing attached. And while concrete is curing, terrazo chippings are inserted in concrete. Terrazo can be ground smooth after concrete has cured.

Another modification of veneered precast panels may have concrete poured into assemblies FA1 or CA1 with or without reinforcing attached, and before the concrete has time to set, toppings of suitable colors of concrete are placed and molded to form imitation stonework, etc., such as "Permastone."

These methods described for casting veneered precast sections can be modified to cast laminated sections with insulation between, similar to the methods described for non-veneered panels.

Figures 57 to 69 show the means used to reinforce block construction.

In general, the forms and reinforcing for precast reinforced concrete construction may be used also for reinforcing cementitious block construction, such as concrete block construction, as well as other constructions that use reinforcing and blocks, such as glass block, plastic block, hollow tile, brick, stone, adobe, and other small masonry units that are rectangular or square faced. It is suitable especially in conventional concrete block construction, using block units eight inches high, sixteen inches wide, and as thick as required to suit the building wall. Concrete block construction in low walls is fairly good for vertical loading without metal reinforcing. Very high concrete block walls, however, often buckle and collapse, because of the lack of reinforcing. Non-reinforced concrete block walls are weak in taking side thrusts. Reinforcing is used in some block construction, usually in the form of small rods which are laid in the horizontal joints. It is not effectively tied together. The method of reinforcing block construction shown on the drawings would allow for the making of economical reinforced concrete block construction. The reinforcing acts as a guide in setting the blocks in addition to acting as reinforcing, thus accomplishing two functions.

Some advantages of this reinforcing method are as follows: It may be the means of making low cost, strong, durable, firesafe masonry construction. It insures neat wall appearance since it would prevent large cracks from forming in concrete block walls. It helps the blocks to set truly, a factor which also helps to make a neater appearance. The reinforcing is prestressed. This increases its effectiveness. This method of construction allows the use of high narrow walls which are able to resist buckling or bending, yet it uses only a small amount of wire reinforcing. Block walls should be strong and able to resist side pressure on buildings if they are to offer security against wartime explosions, including atomic explosions. Reinforcing block construction may also be a means of resisting the forces of high winds, such as those caused by hurricanes. It resists the forces of tidal and fresh water floods which often undermine or knock down block walls. Concrete block construction that has reinforcing added is better able to resist vibrations from machinery and passing vehicles, trains, earthquakes, and vibrations from explosions. Other forces which it resists are landslides, snowslides, and impacts from moving objects, such as missiles driven by the force of winds and explosions, or impact from falling trees. It would be an advantage for a building with poor bearing soil to have this reinforced block construction. If the soil fails in spots, reinforcing would prevent the wall from sagging and cracking. The reinforced concrete block construction would be better able to resist damage from fire since one side of a wall will often get very hot and expand which causes it to buckle and collapse.

Reinforced block construction prevents spalling of walls by eliminating large cracks, which fill with moisture and freeze. By eliminating large cracks, walls repel water and they can be made waterproof more readily. Reinforced waterproof block construction may have hollow spaces in walls filled with water and/or sand and soil, as a barrier against gamma rays emitted by atomic explosions. These insulators may be inserted in walls when there is need for gamma protection, and the sand and water could be drained out after the danger from atomic warfare has passed.

With a reinforced block wall, it would be possible to have the portion of the wall above an opening that is conventionally supported by heavy steel members self supporting. Reinforced concrete block walls act as large concrete beams or girders. In general, reinforcing makes a durable wall which is able to resist large vertical and side loads. Either a single or a double set of reinforcing can be used to make walls strong enough to suit possible loadings. If there is danger only from an outside side pressure and the walls are not too high, a single set of reinforcing on the inside skin of wall would be sufficient. When high concrete block walls are used or when considerable vibration or other high loads are contemplated, two sets of reinforcing should be included in the wall.

Reinforced block construction for floor and roof slabs may be made by the construction method described. In addition to providing a strong floor system, it would prevent large cracks from forming. Hollow blocks, such as those with two holes, could be laid so that holes in the adjacent blocks line-up and form continuous ducts with the holes. These ducts could be used for heating, ventilating, and for wires, piping, etc., similar to ducts described for precast panel construction.

The cost of reinforcing in block construction would be small considering the advantages gained. It would be a very small item in the overall cost of a building. Such a little amount of reinforcing is required for this reinforcing system that it could likely be obtained for construction even in times of material scarcity, such as in wartime.

A plan view of a fragment of a concrete walled structure being erected is shown in Fig. 57. Form section members 36, which are used in assembly FA1, as shown in Fig. 16, are also used to support the reinforcing for block construction. Forms 50 may be used, to a certain extent, instead of forms 36. The forms are removed after mortar joints have cured. Form sections 36 may, to a certain extent, be used in random or standard lengths. If necessary, forms 36 may be cut to suit the conditions prevailing where it is to be used. After use, they can be welded back together, if necessary. Cutting the steel with a burning torch and joining with electric arc welding is an economical means of fabricating in the field. The equipment is often available on a job.

Wire reinforcing 39 for these block constructed walls is the same used in assemblies FA1, Fig. 16. The ends are looped to receive the pins and the reinforcing is in suitable modular unit lengths. Since in the example, slots in forms 36 are spaced at eight inch centers, they are the same as the nominal dimensions for most concrete blocks. A widely used block standard employs concrete blocks eight inches in height and sixteen inches in length, which is the nominal size. Dividing the length by two makes eight inch squares, which is the basic modular unit used in this typical example.

Forms 36 are used to space and hold the reinforcing. In the construction of a block wall, the form sections 36 are set so that the slots which receive the reinforcing are located to suit the location of the wall joints. Vertical form sections 36, which can be cut from standard lengths, are shown in elevation in Figs. 59, 60, and 61. Vertical form sections 36 are connected with bolts to connection angles between the horizontal sections 36. They may be tack welded directly together in the field if welding equipment is available. With this method of construction, the form sections 36 may be set up to maintain accuracy in the wall construction. The horizontal and vertical reinforcing wires, or rods 39, tend to guide the operator in laying the blocks. It would generally be necessary, for double skin reinforcing, to add some of the reinforcing after the block is laid. There is, however, some reinforcing placed beforehand which act as guides. These vertical form sections 36 have connection angles 71 fastened to their base. These angles have holes in their base for nails or lag screws which fasten them to wedges 72. Since a wall should be straight and true, it should be trued up in the beginning, so wedges 72 are placed and adjusted to the correct elevation for the base of angles 71. When the correct elevation is reached, a nail or other securing means can be used to fasten these two adjacent wedges 72 together. Stakes 73 are driven in the ground alongside of wedges 72 and fastened to them. This arrangement holds the wedges 72 securely at the correct elevation and prevents any side movement of wedges. Stakes 73 are driven deep enough to obtain a good bearing because wedges 72 transmit their load to the stakes when the surface soil under the wedges fails from increased moisture caused by rain, etc.

Connection angles 71 are nailed to these wedges 72. Thus the base for forms 36 are fastened securely. The tops of vertical form sections 36 and angles 74 and/or 75 are fastened together. They are bolted or welded to horizontal form sections 36. Separators 76, which may be pieces of strong tubing, are spreaders placed between adjacent parallel forms 36, which are connected with bolts using holes 36c, thus maintaining the correct center to center of the parallel slotted holes in the adjoining parallel forms 36 to suit the thickness of the block wall. These separators 76 tie the form sections 36 together to keep them in alignment and to make them act together for stiffness. Connection angles 77 tie the corner vertical sections 36 together. Since form sections 36 can be relatively limber, if necessary, they may be stiffened with lumber or steel stiffening members 78 and bracing members 78a, as shown by light dot-dash outlines.

Bracing 78a and stiffening 78 may be made of any suitable material that is available. Bracing 78a may often be guy wires. On the forms, it is generally fastened to holes 36c. Stiffening 78 may be used between adjacent forms 36. If stiffening 78 is used between the adjacent form sections 36, separators 76 may be eliminated. Or thinner separator 76 may be used in addition to bracing 78a and stiffening 78 to maintain a proper relationship between parallel form sections 36. Diagonal bracing 78a may be used where it is necessary to prevent the forms from tilting.

In general, Figs. 57 to 62 inclusive show the concrete block wall at completion. To start this wall accurately, forms 36 and 37 may be used as a template and form to set the reinforcing anchors 39a and mold groove in the footer 79, as shown in Fig. 67. This arrangement for setting anchors is similar to the method for casting panel sections shown in Fig. 21. Although this is an arrangement for casting anchors in the footer, it also is the arrangement to cast anchors in a vertical concrete wall or column section. The vertical reinforcing 39 is attached to anchor 39a after the forms 36 and 37 have been stripped from the footer 79. These forms 36 and 37 may be set up accurately with anchors 39a set and held with temporary pins, such as pins 41 in Fig. 21. These parallel forms 36, when used to cast footer 79, may be joined together with separators 76. The forms may be supported with temporary supports, such as lumber, and they would bridge across the footer location.

If vertical forms 36 are set up for a wall before footer 79 is poured, forms 36 and 37, used for footer castings, may be placed between the vertical forms 36. This is not shown in the arrangement in elevations on Figs. 59, 60, 61, and 62, since the wall is shown already built. These footer forms may be supported temporarily from the top of the wall with reinforcing wires from the horizontal forms 36, using fixed links 81 temporarily at the top connection. When footer 79 has cured sufficiently, the forms are stripped. The groove formed by form section 37 acts as a keyway to key the block wall to the footer with mortar. An additional reinforcing wire 46 may be laid down in the clevis-like part of reinforcing anchor 39a in a method similar to that shown in Fig. 25. After the vertical and horizontal form members 36 have been set up and trued, the reinforcing 39 may be fastened to anchor 39a with either permanent pins 47 or wire ties 80 which act as pins. Ties 80, shown in Fig. 67, tie the parallel reinforcing grids together. When a single skin reinforcing alone is used it may be desirable to use the loose hooked end of wire 39 to act as a pin in place of wire tie 80. This would help to prevent the uncoiling of the end of wire 39.

Figures 59 and 61 show exterior or outside block wall surfaces. When such a building wall is subjected to an external side thrust or load, such as a wind load or force of an external explosion, it acts as a beam. The exterior skin is then in compression and the interior skin is in tension. Concrete is a suitable compression resisting material, but a poor tension resisting member, therefore reinforcing wire is added where it is necessary to take the tension. When a high or long wall is subject to wide variations in temperature within a short period, reinforcing is required also on the outside skin, as shown in Fig. 59, to prevent the wall from buckling. The warmest skin would have a tendency to expand excessively, thus requiring reinforcing tension members to restrain the wall from buckling or cracking. The inner skin reinforcing for a wall is described first, since it is the one most likely to be used if single reinforcing is sufficient to take loads and to control cracking. The interior wall skin is also preferred for single grid reinforcing because it is less subject to rain or other moisture seepage which often corrodes reinforcing.

Concrete blocks are laid from the outside in general when only the inside surface of a wall is being reinforced. The horizontal reinforcing wire in Fig. 59 is referred to as 39h and the vertical reinforcing, as 39k. In Figure 60, the horizontal reinforcing is 39f and the vertical reinforcing, 39g. This reinforcing, except in length, is the same as reinforcing 39 described previously, and it has the common numeral 39. These additional reference figures are given only for clarification.

There is a single loop on one end and a double loop on the other end of the reinforcing, although either could be used on both ends in modifications. The reinforcing spacing is based on the use of a modular unit, such as the eight inches used in the examples shown. Reinforcing is made in the desired length based on the number of modular units it spans. An erection sequence for the reinforcing and the concrete blocks shown in elevation in Fig. 60 is as follows:

Assuming that forms 36 have already been erected and braced, that the footer 79 has been poured, and the forms stripped from footer, the ends of horizontal reinforcing 39f would be attached to the vertical forms 36. The left hand end of wire 39f should be connected with fixed link 81, as shown in Fig. 68. Washers or fillers 81a allow reinforcing 39 to be centered, also allow link 81 to fit the slotted holes in form 36. Link 81 and fillers 81a are held by pin 41. Fillers 81a may be permanently welded to link 81, if link 81 is to always hold the single looped end of wire 39. The single loop on wire 39 is connected to link 81 with temporary pin 83. As shown in Figs. 68 and 69, the loose end on wire 39 could be hooked through the loop to prevent unraveling. This fixed end of the reinforcing anchors it. The other end has a spring tension take-up link 82 to take-up the slack and prestress the reinforcing (see Fig. 69). The fixed end holds the setting accurately and the slack is taken up on the right hand end. The right end of reinforcing 39f is connected in the manner shown in Fig. 69. It is a similar arrangement to Fig. 68, except that spring take-up link 82 replaces fixed link 81. It would be necessary to bend link 82 to hook up and prestress the reinforcing. The fillers 82a may be welded to link 82 the same as were fillers 81a and link 81. It is possible to forge pieces link 81 and link 82 with a thicker end to eliminate the fillers.

Figure 66 is similar to Fig. 69. The vertical reinforcing arrangement would be as shown in Fig. 66, at the top, and as shown in Fig. 67, at the bottom. The top end of the vertical reinforcing 39g, or 39, is the take-up end, which is similar to the arrangement shown in Fig. 69. The bottom end is fixed to anchor 39a, as described previously. At the top, a permanent or temporary pin 47 is inserted if it is to be single skin reinforcing construction. The end of the reinforcing can be used as a pin. A tie wire 80a is used, if so desired, for double skin reinforcing. The vertical and horizontal reinforcing may be connected where they cross, either by welding or with short pieces of wire. This would form a wire fabric with wires spaced at eight inch centers in both directions.

For a modified wire grid, prefabricated wire fabric is used, with wires spaced at eight inch centers and the ends twisted to form single and double loops. With square units, such as glass block, it may be used for both skins.

In general, the horizontal strands of reinforcing should be placed toward the center of the wall, and the vertical reinforcing toward the wall surface. If only a single skin of wall is to be reinforced, the block can be laid after the reinforcing wire is erected. In general, the concrete block 84, shown in Fig. 63, would be used. It is similar to some conventional blocks, except for the addition of grooves 84a and 84b which allow space for vertical reinforcing and mortar. A corner block 85, shown in Fig. 64, has grooves 85a and 85b for vertical reinforcing and mortar. It has recesses, such as 85c, to allow the pin and links to clear. Later, when the links are removed, these recesses are filled with mortar. When the joints and grooves are filled with mortar, the reinforcing is protected from fire and the atmospheric elements. If only single skin reinforcing is used, groove 84b is omitted in casting the block. Groove 84b is for the second set of reinforcing used in double skinned reinforcing. The reinforcing is at all the joints and in the vertical grooves. The block is about one quarter or three-eighths of an inch less in over-all size than the modular size of eight by sixteen inches, to allow for the thickness of mortar and reinforcing. Groove 84a would be filled up with mortar either while the block is being laid or afterwards. In general, it should be given a smooth finish similar to that of the block surface so it will look like conventional bonded block construction, which appears strong. The joints could be struck in the grooves for ornamental purposes. The block for single reinforcing construction would, in general, be laid similar to the method used for laying regular non-reinforced block construction. The reinforcing spaces the blocks accurately and thus eliminates the need for using a level and guide string. This accurate truing permitted by the reinforcing would help to compensate for the labor used in erecting forms 36 and the reinforcing.

After forms 36 are removed, the loops on the ends of the reinforcing may be used to connect to other construction units, or to sections of wall. If anchorage along is required, these end loops may be pushed or crumbled into the joint with a hammer or other tool. Large, block walls may be built in succession as desired, and these reinforcing looped ends act in pairs at the construction joints, the same as they act at the precast concrete joint. They tie succeeding wall sections to those already completed so that the stress would be carried through this continuous reinforcing system.

In Fig. 61, at the top right, is shown a floor member which is connected to the reinforcing of the block construction. Fig. 65 is a perspective view showing reinforcing. Double reinforcing is used to take loads caused by temperature reversal stresses in addition to other loadings. When double grid reinforcing is required, as shown in Figs. 59 and 60, the reinforcing for the inner skin, shown in Fig. 60, is assembled in the same manner as is single grid reinforcing. The sequence for erecting the second set of reinforcing, as shown in Fig. 59, has only the horizontal reinforcing erected before the laying of the blocks has started. Vertical reinforcing 39k is not erected until after all the blocks are erected. This method allows the blocks 84 and 85 to be inserted sideways from the outside, clearing the reinforcing already erected. The mortar is placed before the block is inserted. When blocks are inserted, they should be tilted up slightly. While so doing, the operator may lift the upper reinforcing 39h with the top surface of the block to clear the mortar and reinforcing on the top of the row below. Then the tilt of block is reversed so the top of the block can clear the reinforcing 39f without disturbing the bed of mortar. The block is then lowered into place in the mortar. Spring take-up link 82 would allow this slight upward movement of reinforcing 39h.

When the reinforcing for the two skins are connected with reinforcing ties 86, as shown in Figs. 65 and 69, the wire reinforcing creates an egg crate effect. Tying both skin reinforcing grids together with ties 86 makes a strong continuous reinforcing system. The ties 86 in concrete prevent the reinforcing grids from spreading apart and they take horizontal shear. The inner and outer reinforcing grids are kept from coming close together by the center of the blocks, which are straddled by reinforcing wires. Blocks act as spreaders for reinforcing. Ties 86 are connected by welding or twisting, to reinforcing 39g, 39f, and 39h before block laying commences. After tie 86 is welded or twisted to wire 39h, a loose end 86a (see Fig. 65) must remain for fastening wire 39k on when it is erected. Ties 86 are shown welded, which would be the most economical fastening method if welding equipment is available. Loose end 86a, of tie 86, is shown with a dot-dash outline. When blocks are laid with this double skin reinforcing construction, the outside vertical joints are left partially open near the skin surface. This takes vertical reinforcing 39k, which is erected after the wall is built. Grooves 84b and 85b are also left open for reinforcing 39k. Reinforcing 39k is erected and tied with loose ends 86a of ties 86. Then the vertical joints and grooves are filled up with mortar, sealing and bonding the reinforcing into the concrete.

When square-faced units, such as glass block, are used, all the reinforcing may be erected before block laying is started, since the square units may be inserted without interference from vertical reinforcing.

After the forms 36 are removed, the looped ends of the reinforcing may be used to join into extensions to the wall or other building members, such as columns or precast reinforced concrete sections, which are built later. Reinforcing may be used to tie the roof and floor framing to the walls. In Fig. 58, the corners, formed by the intersecting walls, have diagonal wire reinforcing ties 87 and 88 placed diagonally to tie the wall reinforcing together. Thus, continuity in reinforcing is maintained around the corner to carry the stress from one wall to another. The corner square of corner block 85 should be solid, since the reinforcing at the corner may be sealed with concrete. The strength of the additional concrete in the corner is needed for anchorage. Figure 64 shows a corner block which is half solid and half hollow. The diagonal wire ties 87 and 88 may be fastened by twisting them around or welding them to the members they join.

Many modifications may be made of the blocks shown, such as special blocks for particular conditions. If reinforcing block construction were used over large openings, such as door openings, without any other lintel, such as a structural steel member or a reinforced precast concrete member, the reinforced block construction would tend to form a concrete beam. The row of blocks immediately above the opening would have bottom grooves to allow for the recessing of reinforcing. The recessing of the reinforcing in the bottom of the blocks above the opening would require modifications, either to shorten the vertical reinforcing mesh at these blocks from the eight inch modular standard, or to make modified deeper blocks and hold the reinforcing space to eight inches. Reinforcing around the openings, such as doors and windows, would require slight modifications. Forms 36 would be used to hold the reinforcing. They would be cut and assembled to suit conditions, similar to construction at the wall ends. They would be bolted or welded together. The reinforcing could be anchored to steel columns and other structural members by welding a clevis part to fit the loops in the reinforcing and fastening them together with pins and bolts. This reinforced block construction could be substituted for solid concrete, poured in place, for many structures. It does not require conventional costly wood or metal forms such as are necessary for molding poured in place walls. A solid concrete wall is a heavy wall, this weight is often undesirable on poor bearing soil. A solid wall usually conducts moisture faster and holds more moisture than does a good hollow block wall. This moisture is highly undesirable. The reinforcing in block constructed walls keep the damage caused by cracks to a minimum. In general, any cracks would appear in joints and are kept small by the bonding action of the reinforcing. This insures a neat appearing wall. This same reinforcing action would insure fewer cracks, and keep those small, in plaster and stucco, which is often used to cover the blocks.

One of the frequent failures in building construction is that of non-reinforced concrete block walls subjected to the side pressure of moist, loose soil which has become saturated with rain. When walls are reinforced and tied together, they help to strengthen one another. Reinforcing would help to make a homogeneous concrete block structure.

Modifications, such as curved block wall and arch construction, are not shown. It would be similar to straight wall construction with suitably shaped blocks.

To fit conditions, either single or double skin reinforcing could be used in the curved wall and roof construction. Even if the reinforcing in arch construction that is corroded by moisture seepage fails, there would not be structural failures in general. Cracks would develop to larger proportions. Curved reinforced block construction, such as silos, would have the outside skin of the wall reinforced, if only the single grid reinforcing is used. In arch construction, the reinforcing would be of secondary importance, since thick arches are practically all in compression.

Reinforced block constructed floors can be made similar to the walls. Either single or double skin reinforcing may be used. Single reinforcing, in general, should be on the bottom. When double skin reinforcing is used and a finish slab is poured on it, joints and grooves should not be filled with mortar after reinforcing, such as wire 39k, is placed because the finished slab would key into the open joints and grooves.

Reinforced concrete block construction can be used in combination with other reinforced concrete construction, such as the large precast sections. For instance, walls may be of reinforced block construction with the roof and floor systems made with flat or corrugated precast sections with all the reinforcing connected to maintain continuity in reinforcing system. This would usually require some modifications, for example, if walls were block construction and roof corrugated arch construction, a modified row of blocks at top of wall would have reinforcing diverged from the bottom to the top of the blocks, with the reinforcing connections on the bottom of these modified blocks matching into the typical block reinforcing and those on top matching into the arched corrugated sections above.

Thus it will be seen that I have provided a novel precast building panel which may be flat or curved and which may or may not include reinforcing, as desired, which panel is provided with uniformly spaced fastening means about the perimeter to permit fastening of like panels in edge-to-edge relationship in a rapid and easy manner to provide continuity of the panels and reinforcing; also, I have provided novel forms of channel-shaped construction for precasting concrete building panels separately or in stacked relationship (the latter being particularly useful for precasting curved panels), and in a manner to enable anchoring of the ends of a grid-like reinforcing to the forms and prestressing thereof, if desired, also, I have provided a novel corrugated building construction which is able to withstand severe forces despite its extremely light weight and whose panels may be made of standard construction to enable speedy erection of the building by fastening the panels in edge-to-edge relationship, thereby considerably reducing costs in prefabrication as well as in assembly, thus making such buildings suitable for low cost housing projects or for shelters against natural or war caused violent forces.

While I have illustrated and described several embodiments of my invention, it will be understood that these are by way of illustration only, and that various changes and modifications may be made within the contemplation of my invention and within the scope of the following claim.

I claim:

A precast, cementitious building panel of substantially rectangular outline, said panel having a bowed cross-section, said outer and inner surfaces of said panel having planes of identical curvature, the end portions of said cross-section being truncated, the extremities of said truncated end portions being in planes which are substantially parallel to each other and are substantially perpendicular to the subtended chord of said cross-section, said panel having a continuous groove formed in the perimetrical edge thereof throughout the entire periphery, including said truncated end portions, for receiving mortar grout for keying together similar panels when placed in edge-to-edge relationship, a multiplicity of prestressed metal reinforcing strands arranged in grid formation and extending through a medial plane of said panel, the ends of said strands projecting outwardly from said groove, the ends of said strands including metallic fastening means, the fastening means on opposite edges being identically spaced and in alignment, said fastening means being in the form of eyes along two adjoining edges of said panel, and in the form of clevises along the other two adjoining edges of said panel, said eyes and clevises having apertures facing said planes of said outer and inner surfaces to facilitate entry of pins transversely of said surfaces through said fastening means, the centers of the said apertures being substantially in registry with the center of the gap between two joined panels, whereby when two panels of the construction recited above are placed in edge-to-edge relationship, an eye of one panel will align with a clevis of the adjoining panel so that a fastening pin element may be extended through them for fastening together the reinforcing strands of both panels.

References Cited in the file of this patent

UNITED STATES PATENTS

| Re. 15,440 | Lichtenberg et al. | Aug. 29, 1922 |
| 882,482 | Wilson | Mar. 17, 1908 |
| 951,011 | Lambert | Mar. 1, 1910 |
| 1,237,542 | Morgal | Aug. 21, 1917 |
| 1,319,731 | Stuverud | Oct. 28, 1919 |
| 1,553,157 | Henderson | Sept. 8, 1925 |
| 2,127,973 | Isett | Aug. 23, 1938 |
| 2,159,991 | Hilpert | May 30, 1939 |
| 2,204,195 | Steinmetz | June 11, 1940 |
| 2,257,153 | Blaski | Sept. 30, 1941 |
| 2,303,062 | Parkhurst | Nov. 24, 1942 |
| 2,335,433 | Minck | Nov. 30, 1943 |
| 2,425,079 | Billig | Aug. 5, 1947 |
| 2,616,149 | Waller | Nov. 4, 1952 |

FOREIGN PATENTS

| 8,404 | Great Britain | Aug. 1, 1912 |
| 205,085 | Switzerland | June 15, 1939 |